United States Patent
Bradford et al.

(10) Patent No.: US 8,663,523 B2
(45) Date of Patent: *Mar. 4, 2014

(54) FOLDED PRODUCT MADE FROM EXTRUDED PROFILE AND METHOD OF MAKING SAME

(71) Applicant: Bradford Company, Holland, MI (US)

(72) Inventors: Judson A. Bradford, Holland, MI (US); Calvin D. Nyeboer, Holland, MI (US)

(73) Assignee: Bradford Company, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/658,917

(22) Filed: Oct. 24, 2012

(65) Prior Publication Data

US 2013/0042965 A1    Feb. 21, 2013

Related U.S. Application Data

(63) Continuation of application No. 11/566,973, filed on Dec. 5, 2006, now abandoned.

(51) Int. Cl.
*B32B 3/12* (2006.01)

(52) U.S. Cl.
USPC ............. 264/177.12; 264/177.17; 264/284; 264/285; 428/73; 428/116; 428/118

(58) Field of Classification Search
USPC .......... 264/177.12, 177.17, 284, 285; 428/73, 428/118
See application file for complete search history.

(56) References Cited

U.S. PATENT DOCUMENTS

| | | | |
|---|---|---|---|
| 1,886,830 A | 11/1932 | Murray, Jr. | |
| 2,716,805 A * | 9/1955 | Reed | 72/256 |
| 3,379,594 A * | 4/1968 | Bruder | 156/292 |
| 3,582,447 A | 6/1971 | Stolki | |
| 3,904,551 A * | 9/1975 | Lundsager et al. | 502/241 |
| 4,197,341 A | 4/1980 | Rule | |
| 4,847,966 A * | 7/1989 | Kuchelmeister | 29/890 |
| 5,132,156 A | 7/1992 | Trassare, Jr. et al. | |

(Continued)

FOREIGN PATENT DOCUMENTS

| | | |
|---|---|---|
| DE | 19716637 | 10/1998 |
| FR | 1509018 | 1/1968 |

(Continued)

OTHER PUBLICATIONS

Pflug et al, Jochen, "Folded Honeycomb Cardboard and Core Material for Structural Applications", Sandwich Construction 5, EMAS 1999, 12 pages.

(Continued)

*Primary Examiner* — Christina Johnson
*Assistant Examiner* — David Schmerfeld
(74) *Attorney, Agent, or Firm* — Wood, Herron & Evans, LLP

(57) ABSTRACT

A product 10 made from an extruded sheet or web of material 42 having a non-linear cross-section, and the process of making the product 10 is provided. The extruded web or extrudate 42 is plastically deformed in selected areas and then folded. When folded into the appropriate shape, the extrudate 42 is formed into a product 10 having a plurality of cells 14. Optionally, the cells 14*a* can include one or more openings 34*a*, allowing access to an interior of the cell 14*a* and reducing the weight of the product 10*a*.

19 Claims, 16 Drawing Sheets

(56) References Cited

U.S. PATENT DOCUMENTS

| | | | |
|---|---|---|---|
| 5,389,059 | A | 2/1995 | Corwin |
| 5,660,904 | A | 8/1997 | Andersen et al. |
| 6,183,836 | B1 | 2/2001 | Pflug |
| 6,460,724 | B1 | 10/2002 | Bradford |
| 6,720,060 | B1 * | 4/2004 | Swars .................. 428/116 |
| 6,726,974 | B1 | 4/2004 | Pflug et al. |
| 6,800,351 | B1 | 10/2004 | Pflug et al. |
| 8,454,781 | B2 * | 6/2013 | Bradford .................. 156/201 |
| 2005/0077618 | A1 | 4/2005 | McCutcheon et al. |
| 2005/0263244 | A1 | 12/2005 | Henderson et al. |
| 2006/0049065 | A1 | 3/2006 | Chevalier et al. |
| 2006/0191985 | A1 | 8/2006 | Norcom |

FOREIGN PATENT DOCUMENTS

| | | |
|---|---|---|
| WO | 9703816 | 2/1997 |
| WO | 0032382 | 10/1999 |
| WO | 0168351 A1 | 9/2001 |
| WO | 2006053407 A1 | 5/2006 |

OTHER PUBLICATIONS

Pflug et al, Jochen, "Continuously Produced Honeycomb Cores", K.U. Leuven Dept. MTM, (no date), 10 pages.

"Composite Materials Group", "TorHex Projects", http://www.mtm.kuleuven.ac.be/Research/C2/poly/TRHex.htm, (2004), 6 pages.

Pflug et al, Jochen, "Thermoplastic Folded Honeycomb Cores—Cost Efficient Production of All Thermoplastic Sandwich Panels", K.U. Leuven, Dept. Mechanical Engineering, (no date) 8 pages.

Eureka EU 1440 Factory, "E! 2796 Factory Thermhex—New Thermoplastic Honeycomb Sandwich Core Material for Structural Applications", http://www.kp.dir.de/EUREKA/FACTORY/publications.htm, (Sep. 9, 2005), 6 pages.

Project Page, "Composite Materials Group", K.U. Leuven Dept. MTM, Maschinenfabrik Meyer, (no date), 1 page.

Pflug et al, Jochen, "New Sandwich Material Concepts—Continuously Produced Honeycomb Cores", Composites in Transport Network, K.U. Leuven, Dept. MTM, Oct. 2, 2003, 32 pages.

* cited by examiner

FOLDED PRODUCT MADE FROM EXTRUDED PROFILE AND METHOD OF MAKING SAME

CROSS-REFERENCE TO RELATED APPLICATIONS

This application is a continuation of U.S. patent application Ser. No. 11/566,973, filed Dec. 5, 2006 entitled "Folded Product Made From Extruded Profile and Method of Making Same", which is fully incorporated herein.

FIELD OF THE INVENTION

This invention relates generally to a product for structural, packaging, and other applications and the process of making the product.

BACKGROUND OF THE INVENTION

In the aerospace industry, honeycomb products have been used as a core component for sandwich panels and boards that are resistant to buckling and bending. These honeycomb products each comprise a plurality of cells, which in cross-section have a generally hexagonal shape. Such products may be fabricated from aluminum, fiber paper or plastic, among other materials. A sandwich structure may be prepared having two cover layers or skins which are welded, adhesively bonded or otherwise secured to the honeycomb product to create a multi-layered or multi-laminate material. Interest expressed in other industrial sectors concerning the use of light weight sandwich structures is continually growing, due at least in part to the realization of its high strength properties while maintaining a relatively low structural weight per volume of product.

A multi-layered or multi-laminate material having a honeycomb product as the core thereof may be used in the packaging industry. However, in automobile part packaging and comparable markets, such a product must compete with corrugated paperboard or corrugated plastic or like materials which may be produced quickly and relatively inexpensively.

U.S. Pat. No. 6,183,836 discloses a honeycomb core for use in a sandwich material in which the material of the honeycomb core is cut and then folded to create a plurality of hexagonal cells. Due to the cuts in the sheet prior to folding the sheet, the resultant cells may be weaker than desired.

A process for producing a folded honeycomb core for use in sandwich materials from a continuous uncut web is disclosed in U.S. Pat. No. 6,726,974. U.S. Pat. No. 6,800,351 discloses another process for producing a folded honeycomb core which includes scoring a corrugated material before rotating interconnected corrugated strips. The honeycomb core resulting from using either of these methods may have material which adds to the weight of the honeycomb core but may not significantly improve the strength of the honeycomb core.

Accordingly, there is a need for a product which may be used alone or in a multi-layered material, and which has a favorable strength-to-weight ratio.

There is further a need for a process for manufacturing a product such as a honeycomb product for use alone or in a multi-layered material which is less expensive and may be produced in higher quantities than heretofore known processes.

SUMMARY OF THE INVENTION

These and other objectives of the invention have been attained in a process for producing a product, such as a honeycomb product, for use alone or in a sandwich-like product. The process includes extruding a web of material which has a non-planar profile, i.e., has a non-linear cross-section, plastically deforming or treating portions of such web, and then folding the treated web to produce the product. Other fabrication operations may optionally be included in the process. The process of preparing a web of material suitable for further fabrication into a product is rendered efficient in part by producing an extrudate having a non-linear cross-section. For purposes of this document, linear shall be defined as a single straight continuous line, the shortest distance between two points. Each of the extrudates or extruded webs illustrated herein has a non-planar profile and has a non-linear cross-section. Shapes of other webs of material not shown are intended to be included in such a definition.

The extrudate displays a non-linear cross-sectional configuration upon exiting the extruder head. This cross-section may assume any of a variety of shapes. A relatively simple shape would be that of a continuous sine wave. Another example is corrugated plastic. More complex shapes can include interrupted sine wave sections connected by straight lines, one or more polygons connected by straight lines, nested polygons, and the like, as needed or desired in connection with ultimately preparing the core structure of interest.

Representative product, like a honeycomb product, can be produced using a variety of starting materials capable of being processed through an extruder, including various plastic compositions, in an efficient manner to produce a product having good strength-to-weight properties. The product may be used alone, or may be incorporated as a part of a multi-layered sandwich-like material to produce, for example, panels or sheets used in structural applications. More broadly, the products of the present invention may be used in any desired environment or industry. For example, product may be produced under conditions which generate a material having a high surface area. The material may then be further treated to produce a product having surface activity, which could be used, for example, in catalytic applications.

According to one aspect of this invention, a process of making a product comprises extruding a web of material having a predetermined or desired width or transverse dimension, the extruded web having a generally non-linear cross-section; plastically deforming, such as flattening areas of the extruded web; and folding the web.

As defined herein, the term "web" encompasses material processed in extrusion equipment intended to accept the specific material introduced into that equipment, and issuing or exiting from an extruder head. The extrudate has a non-linear cross-section. In one aspect of the present invention, a plurality of openings may be introduced into the extruded web. These openings can be introduced by stamping the material, but may also include processing of the extruded web by one or more tools to thereby form the openings. As used herein, a tool is intended to encompass any device, or energy flowing from that device, which is used to desirably alter the physical appearance of the web. Thus, by way of example and not by limitation, a tool for the purpose of forming a plurality of openings in the extruded web can include a laser cutter, one or more rotating cutting blades, a perforating or slitting machine, and the like.

The process of plastically deforming or flattening selected areas of the extruded web can comprise contacting the extruded web with an element which may be heated. Alternatively, selected areas of the extruded web can be flattened by a tool applying pressure, heat, or a combination of pressure and heat, in one or more selected areas. The process of flattening may alternatively precede the introduction of openings into the extruded web, may follow the introduction of openings into the extruded web, or the two processes may occur substantially simultaneously.

One type of non-linear cross-section shape which the extruded web may display is a generally corrugated shape with flattened peaks and flattened valleys along the transverse dimension of the extruded web. Further, the extruded web is folded along transversely extending fold lines during the folding step. One or more individual cells can be formed as a result of the folding step, for example, where a section of the extrudate is oriented at 90° from its original position by the folding operation.

The process of making a product, like a honeycomb product, may also encompass extruding a web having a generally non-linear cross-section which, in addition, forms a plurality of substantially closed channels. Small openings in one or more channels, up to all channels in the extruded web, may be introduced to facilitate introduction of a cooling medium to the extrudate, as required based on the particular material utilized to produce the web and the complexity and wall thickness of the web, or portions thereof. The openings may extend in a continuous fashion along the entire length of the channel, or openings may be intermittently introduced along the channel length. Further processing with one or more tools can be effected on this type of extruded web in a manner similar to that discussed above to alter the appearance of the extruded web, by cutting, flattening, folding and the like.

The product of this invention can also comprise an extruded web having a non-linear cross-section formed into a plurality of similar cells arranged in rows, wherein at least some of the rows of cells are being made of two row walls, each of the row walls having alternating planar and non-planar regions, the planar regions of the adjacent row walls being joined together and non-planar regions of the adjacent row walls defining side walls of the cells, wherein each of the cells have side walls, a top and a bottom. This product can be characterized by at least one opening created by at least one tool in at least some of its cells.

In a further aspect, the product has at least some openings in lateral side walls of at least some of the cells. At least some of the cell openings can be of a pre-defined size, or of a pre-defined shape, or both a pre-defined size and shape.

The product made from extruded web material can be produced by manipulating the web material into a plurality of similar cells arranged in rows, at least some of those cells being made of a continuous cell wall, the continuous cell wall may have any desired shape including the shape generally of a ring, wherein the cells are oriented substantially 90° to the longitudinal dimension of the extrusion web material.

Another aspect of the invention is a product, such as a honeycomb product, made by the process of extruding a web of material having a transverse dimension, the extruded web having a generally non-linear cross-section; creating a plurality of generally planar areas in the extruded web; folding the extruded web along edges of the generally planar areas to create a plurality of identical cells arranged in rows, at least some of the rows of cells being made of two row walls, each of the row walls having planar and non-planar regions, the regions of adjacent row walls being joined together, and non-planar regions of adjacent row walls defining side walls of the cells, each of the cells also having a top and a bottom. If desired, one may form in at least some of the cells an opening created by at least one tool.

The tops and bottoms of the cells of the honeycomb product described herein may be in the shape of a polygon. More specifically, the honeycomb product may be shaped such that the polygon is a hexagon. In a further aspect of the invention, each of the cells may have an opening allowing access to an interior of the cell.

In another aspect of the invention, where a plurality of openings is formed in the web of material, those openings typically extend completely through the web. The openings may be circular, but may assume one of any number of other shapes, such as oval, hourglass, asymmetric, and the like. The openings optionally correspond to locations along the web wherein material has been removed to realize good strength-to-weight properties.

Regardless of the method used to create the product, one advantage is that a light weight, strong product may be quickly and easily manufactured in a desired size or height. The product of this invention, which is produced according to the processes described herein, has a good strength-to-weight ratio even without forming openings in the web, and may be made from many different materials quickly and inexpensively. The strength-to-weight ratio may be improved by strategic removal of material from the extruded web at some time in the process of fabricating the product. The product may be used alone, incorporated into a multi-layered sandwich-like material, or used in any other desired manner.

BRIEF DESCRIPTION OF THE DRAWINGS

The objectives and features of the present invention will become more readily apparent when the following detailed description of the drawings is taken in conjunction with the accompanying drawings in which.

DETAILED DESCRIPTION OF THE DRAWINGS

Figure 5A:
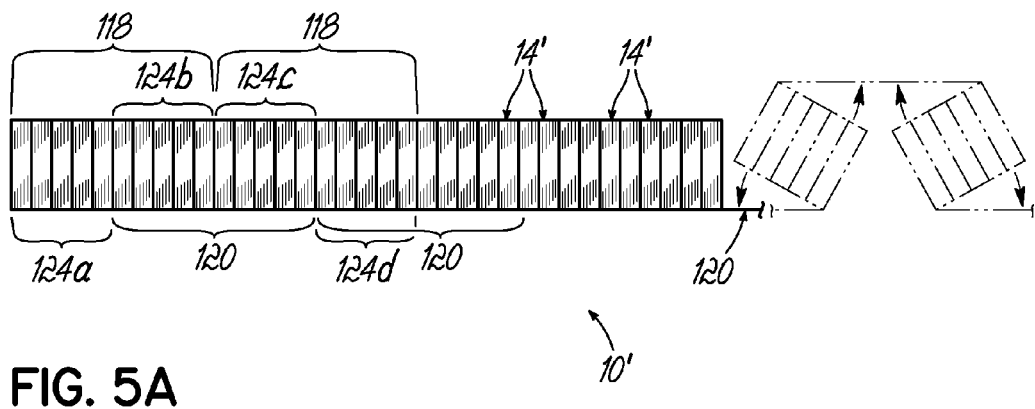
FIG. 5A is a side elevational view of the web of FIG. 4A after orientation to create a portion of a honeycomb product.
Figure 5B:
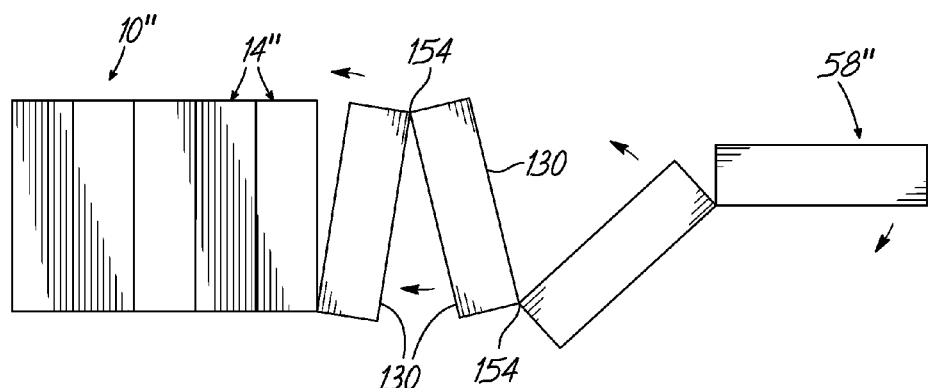
FIG. 5B is a perspective view of a portion of the plastically deformed web of FIG. 4B being folded to create rows of cells.
Figure 5:
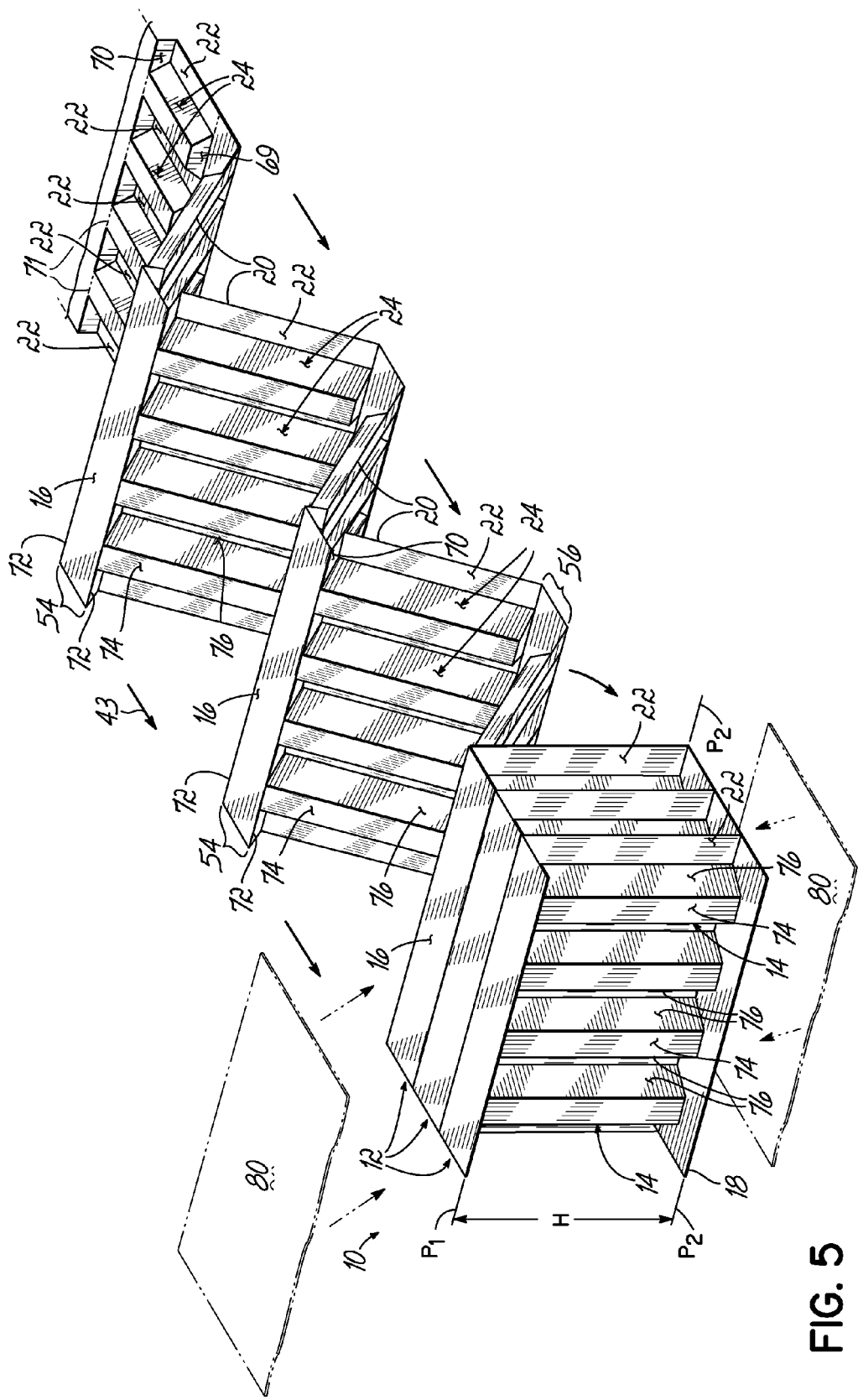
FIG. 5 is a perspective view of a portion of the plastically deformed web of FIG. 3 being further folded to create a portion of a honeycomb product.
Figure 6:
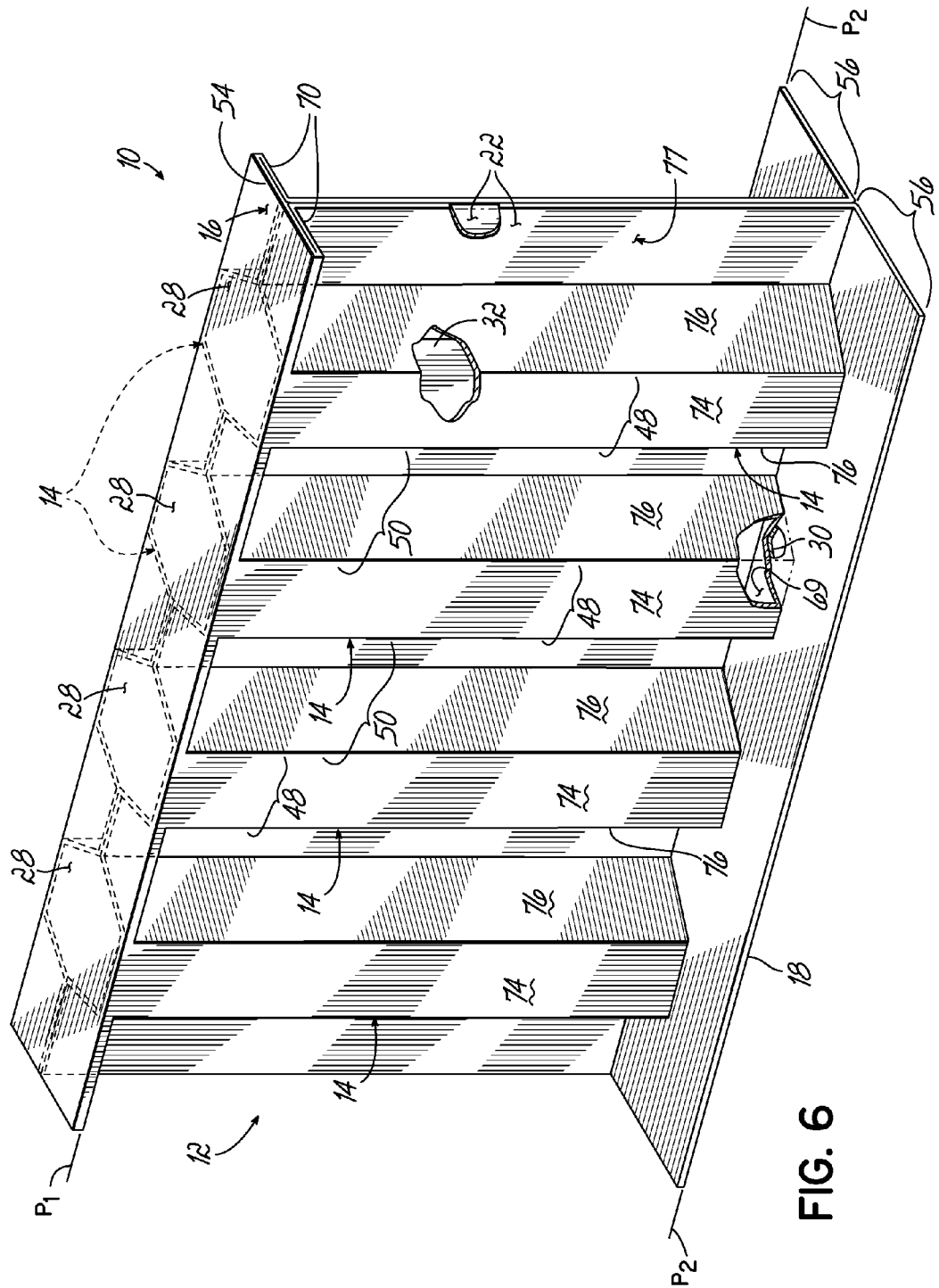
FIG. 6 is a perspective view of a row of cells.

Referring to FIG. 5, a portion of a honeycomb product 10 according to one embodiment of this invention is shown. The honeycomb product 10 may be made using numerous processes, including those described herein and others within the scope of the claims. FIG. 5 shows a portion of a honeycomb product 10 comprising a plurality of rows 12 of identical cells 14 made from extruded web or sheet of material. FIG. 6 illustrates one such row 12 of cells 14. Referring to FIG. 5, the honeycomb product 10 has a generally planar upper surface 16 in a generally horizontal plane P1 and a generally planar lower surface 18 in a generally horizontal plane P2, the distance between which defines the height H of the honeycomb product 10. The height H of the honeycomb product 10 may be any desired distance and is not intended to be limited to the height of the illustrated portion of the honeycomb product.

Figure 4A:
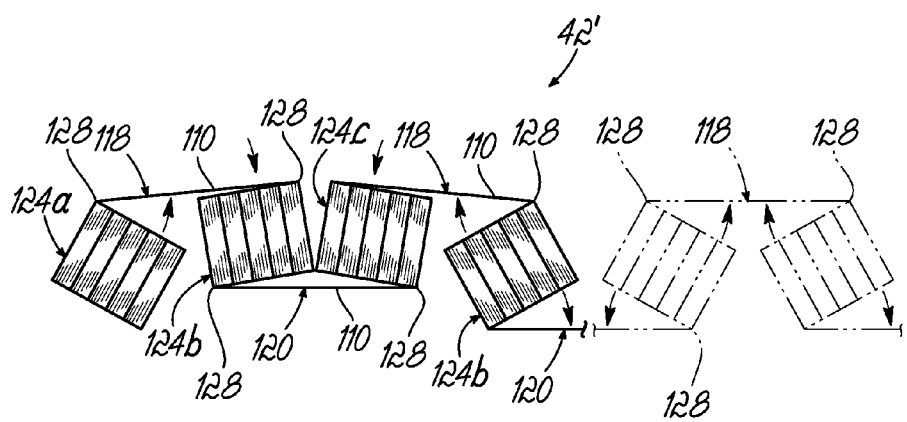
FIG. 4A is a side elevational view of the web of FIG. 3A being folded to create re-oriented portions containing channels.
Figure 4:
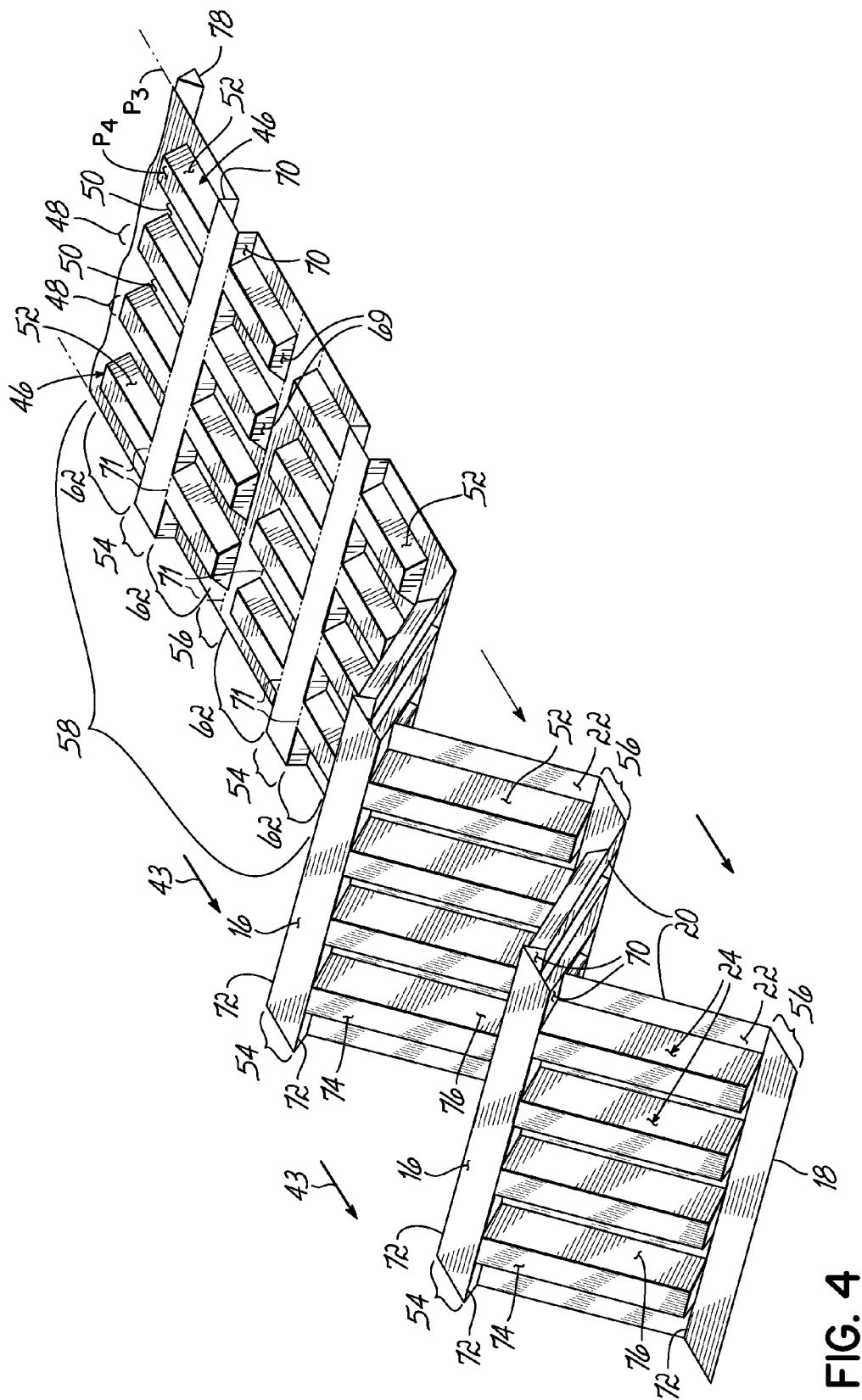
FIG. 4 is a perspective view of a portion of the plastically deformed web of FIG. 3 being folded to create rows of cells.

As shown in FIGS. 4 and 5, each row 12 of cells 14 is made by bringing two adjacent hinged row walls 20 together in an accordion-like manner. Each row wall 20 has alternating planar and non-planar regions or areas 22, 24, respectively. Each non-planar region 24 in FIGS. 4 and 5 comprises three rectangular walls comprising a half-hexagon in cross-section. Regions 24 are bounded by planar regions 22. During the process of making the honeycomb product 10, adjacent row walls 20 are brought together so that the planar regions 22 of adjacent row walls 20 at least partially contact each other and the non-planar regions 24 of row walls 20 define sides or side walls 74, 76 of cells 14.

In certain applications, such as, for example, when a web of thermoplastic material is heated at some stage in the manufacture of the honeycomb product 10, the planar regions 22 of adjacent row walls 20 may be bonded, welded or secured to each other without any additional material. Alternatively, adhesive or another bonding agent may be used to secure adjacent row walls 20 together to complete the rows 12 of cells 14. The non-planar regions 24 of adjacent row walls 20 are spaced apart and define the shape or configuration of the cells 14 after the manufacturing process has been completed. Outermost portions or sides 74 of adjacent cells 14 in different rows 12 may contact each other and may be secured to each other in certain applications of this invention.

Although the drawings illustrate each non-planar region 24 of each row wall 20 having a cross-sectional configuration of a half-hexagon, the non-planar regions of the row walls may have any desired cross-sectional configuration, such as, for example, a curved or arcuate or sinuous cross-sectional configuration. The creation of the side walls or sides 74, 76 of the cells 14 is described in more detail below. Depending upon the application, the cells 14 may be any desired shape or size.

As best illustrated in FIG. 6, each cell 14 has a top 28 and a bottom 30 of a predetermined size and/or shape. As shown in FIG. 5, the tops 28 of the cells 14 are located in plane P1 and make up part of the upper surface 16 of the honeycomb product 10. Likewise, the bottoms 30 of the cells 14 are located in plane P2 and make up part of the lower surface 18 of the honeycomb product 10. The top 28, bottom 30 and sides 72, 74 of the cell 14 define a cell interior 32.

In the illustrated embodiment, each cell top 28 and bottom 30 is a polygon and, more particularly, a hexagon. However, if the non-planar regions of the row walls were in the shape of half a cylinder, then the tops and bottoms of the cells would be circular or oval, and the cells would have a cylindrical interior.

Figure 1:
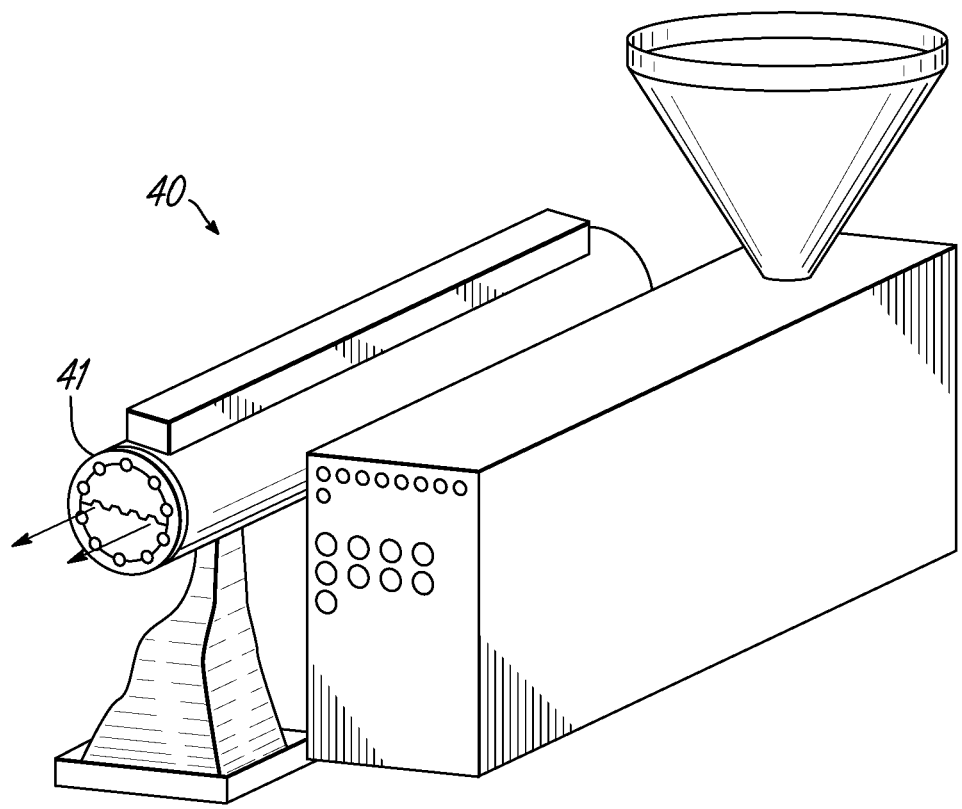
FIG. 1 is a perspective view of a web of material having a generally non-planar cross-section being extruded from an extruder.

FIGS. 1-4 illustrate a method or process of making a honeycomb product 10 which may be used alone, in a multi-layered material or product, or in any desired manner. FIG. 1 illustrates an extruder 40 extruding a web of material 42, which is shown in more detail in FIG. 2. Although one configuration of extruder 40 and extruder head 41 is illustrated, any type or configuration of extruder known in the art may be used. The extruder and extruder head configurations will vary as a function of the material being extruded and the cross-section of the extrudate. The material can include any of a variety of plastic compositions and any other material capable of being extruded, and can encompass additional compositions which can be further processed to produce a honeycomb product.

Figure 2:
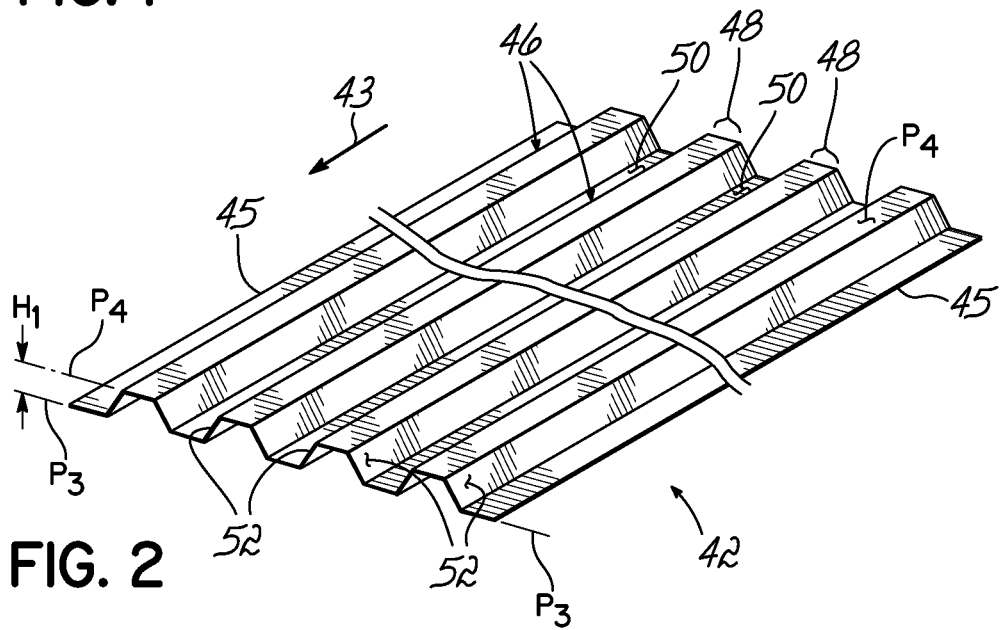
FIG. 2 is a perspective view of a portion of the extruded web of FIG. 1.

In FIG. 2, the extruded web 42 travels in a direction indicated by arrow 43 and have a pair of opposed side edges 45, the linear distance between which defines the width or transverse dimension of the extruded web 42. The extruded web 42 may be any desired material of any desired thickness and/or width.

Figure 1A:
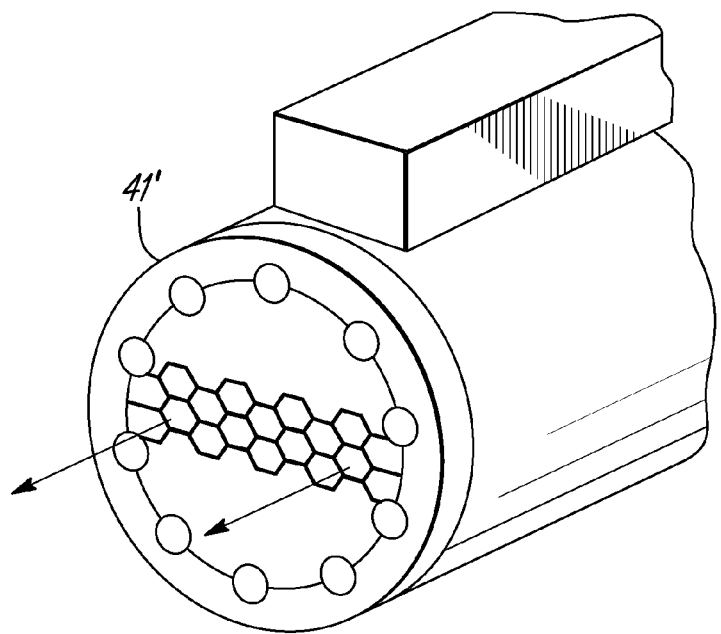
FIG. 1A is a perspective view of a web of material having a generally non-linear cross-section being extruded from an extruder head of alternate design.

The extruded web 42 has a generally non-linear cross-section or cross-sectional configuration. In cross-section, the extruded web 42 has a generally corrugated configuration or shape, including a plurality of flattened peaks 48 and a plurality of flattened valleys 50 joined together by connecting portions 52. Each of the flattened peaks 48, flattened valleys 50 and connecting portions 52 are longitudinally extending, as shown in FIG. 2. The flattened valleys 50 are all generally co-planar in a horizontal plane P3. Likewise, the flattened peaks 48 are all generally co-planar in a horizontal plane P4 above the plane P3. The linear distance between the planes P3 and P4 defines the height H1 of the corrugations 46. Although one shape or configuration of extruded web 42 is illustrated in FIG. 2, the extruded web 42 may assume numerous other non-linear configurations in cross-section. For example, the expanded view of the extruder head in FIG. 1A shows an alternate cross-sectional shape, which can be used to create the non-linear cross-section extruded web. A perspective view of the extruded web 42' formed by the alternate extruder head design is provided in FIG. 2A.

Figure 3B:
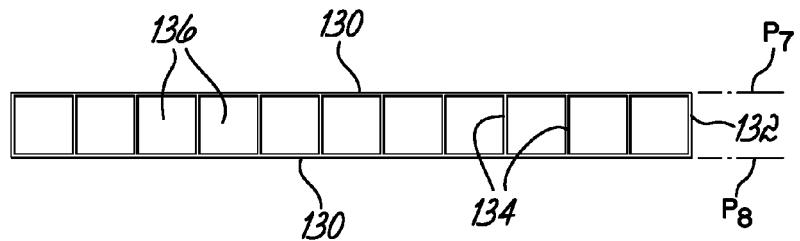
FIG. 3B is an end view of the extruded web of FIG. 2B.
Figure 3C:
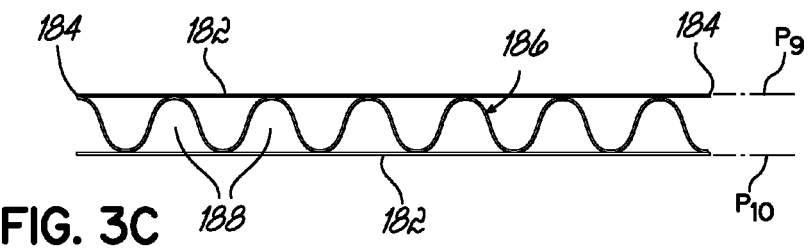
FIG. 3C is an end view of the extruded web of FIG. 2C.
Figure 3:
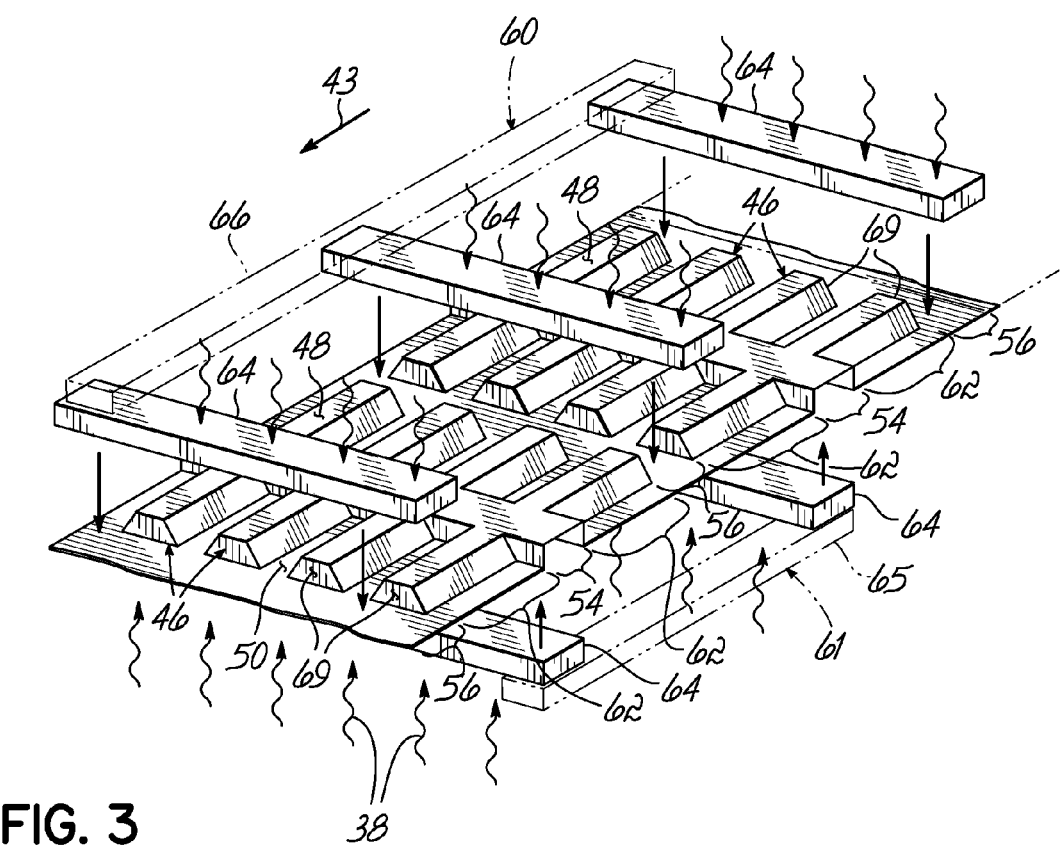
FIG. 3 is a perspective view of a portion of the extruded web of FIG. 2 being treated to create transversely extending flats.

FIGS. 3 and 4 illustrate a step in this process of making honeycomb product 10 comprising plastically deforming or flattening at least selected portions or areas 54, 56 of the extruded web 42 to create a plastically deformed extruded web 58. This plastic deformation may include using movable tools 60, 61, such as shown in FIG. 3 to interrupt the continuous corrugations 46 formed in the emerging extruded web 42 and create a plurality of corrugated regions or areas 62, each comprising a plurality of corrugations 46 extending in a first direction generally parallel the direction of travel 43 of the extruded web 42 or longitudinally, and a plurality of flats or flattened areas 54, 56 each extending in a second direction perpendicular to the first direction, transversely or from side-to-side. The size of these regions or areas 62, 54 and 56 may vary depending upon the desired size or shape of the cells 14 of the honeycomb product 10.

Although tool 60 is illustrated as comprising three bars 64 joined together with connectors 66 (only one being shown for clarity) and tool 61 is illustrated as comprising two bars 64 joined together with connectors 65 (only one being shown for clarity), respectively, these tools 60, 61 may comprise any number of bars of any desired size or configuration joined together or not. Although two tools are illustrated, any number of tools of any desired type or configuration may be used. Again, the term tool is not intended to be limiting and may include any tool known in the art.

During the step of plastically deforming at least selected portions of the extruded web 42, the bars 64 of the tools 60, 61 may be chilled, at ambient temperature, or heated by any desired method to facilitate processing. Such heating is illustrated schematically by arrows 38. This heating step is optional and may be used in certain applications only. In other applications, it may be omitted partially or entirely. Although it is shown schematically after the flats 54, 56 have been created in the extruded web 42, this heating step may occur any time during this manufacturing process.

Due to the creation of the flattened areas or flats 54, 56, each corrugation 46 may have an end portion 69 which extends between a peak 48 and a valley 50. These end portions 69 are illustrated as each being in the shape of a trapezoid, but may be other shapes, depending upon the shape of the corrugations.

As best illustrated in FIGS. 3 and 4, each generally rectangular, transversely extending flat or flattened area 56 is located in the plane P3 of the extruded web 42. Each generally rectangular, transversely extending flat or flattened area 54 is located in plane P4 above the plane P3 of the extruded web 42 and co-planar with the plane of the flattened peaks 48 of corrugations 46. Flattened areas 56 and 54 alternate between corrugated regions 62. As seen in FIG. 4, due to the shape of the tools 60, 61, each flat or flattened area 54 has side walls 70 extending from the outer edges of the flat 54 to the flattened valleys 50 in the corrugated regions 62. These side walls 70 are illustrated as each being in the shape of a trapezoid, but may be other shapes, depending upon the shape of the corrugations. Although not shown, the corrugations may have a semi-circular, sinuous, curved or other cross sectional configuration.

As shown in FIG. 4, the plastically deformed web portion 58 is then folded along transversely extending fold lines 72 located generally on the edges of the flats 54, 56. Such fold lines 72 may be optionally scored or perforated at any step in the manufacturing process with cuts 71 to assist folding. Such scoring may be made by a separate tool or tools. As shown in FIG. 5, after the plastically deformed web portion 58 is folded along transversely extending fold lines 72, side walls 70 lay underneath and may contact the raised flat 54, and end walls 69 of corrugations 46 rest on and contact flats 56.

As best illustrated in FIG. 6, side walls 70 abut and are underneath portions of the raised flats 54. These two-ply areas comprise approximately half of the tops 28 of some of the cells 14. In such cells, the bottom 30 of the cell 14 is a single ply which was formed in the flat 56 before folding. As shown in FIG. 6, end walls 69 abut and are above portions of the flats 56 to form approximately half of the bottoms 30 of other cells 14. In such cells, the top 28 of the cell 14 is a single ply which was formed in the flat 54 prior to folding. Thus, in one row 12 of cells 14, each cell 14 has a single ply top 28 and a double ply bottom 30. In adjacent rows of cells 14, each cell 14 has a double ply top 28 and a single ply bottom 30.

As shown in FIGS. 4, 5 and 6, after the plastically deformed web portion 58 is folded along transversely extending fold lines 72, the corrugations 46, or non-planar regions 24 of the row walls 20, become the side walls 74, 76 of the cells 14. More particularly, the generally planar peaks 48 of corrugations 46 shown in FIG. 4 become the outmost side walls 74 of the cells 14, and the generally planar connecting portions 52 of corrugations 46 become additional side walls 76 of the cells 14. As shown in FIGS. 5 and 6, within a row 12 of cells 14, the planar portions 22 of row walls 20 come together to create flattened two-ply portions 77 of row 12. Side walls 74, 76, along with the top 28 and bottom 30 of each cell 14, define a cell interior 32.

The last step in the process is to cut the extruded web 42 at any desired location. FIG. 4 illustrates a cutter 78 at one location. However, one or more cutting tools or devices may be used at any desired location to create a honeycomb product 10 of a desired length.

Figure 7:
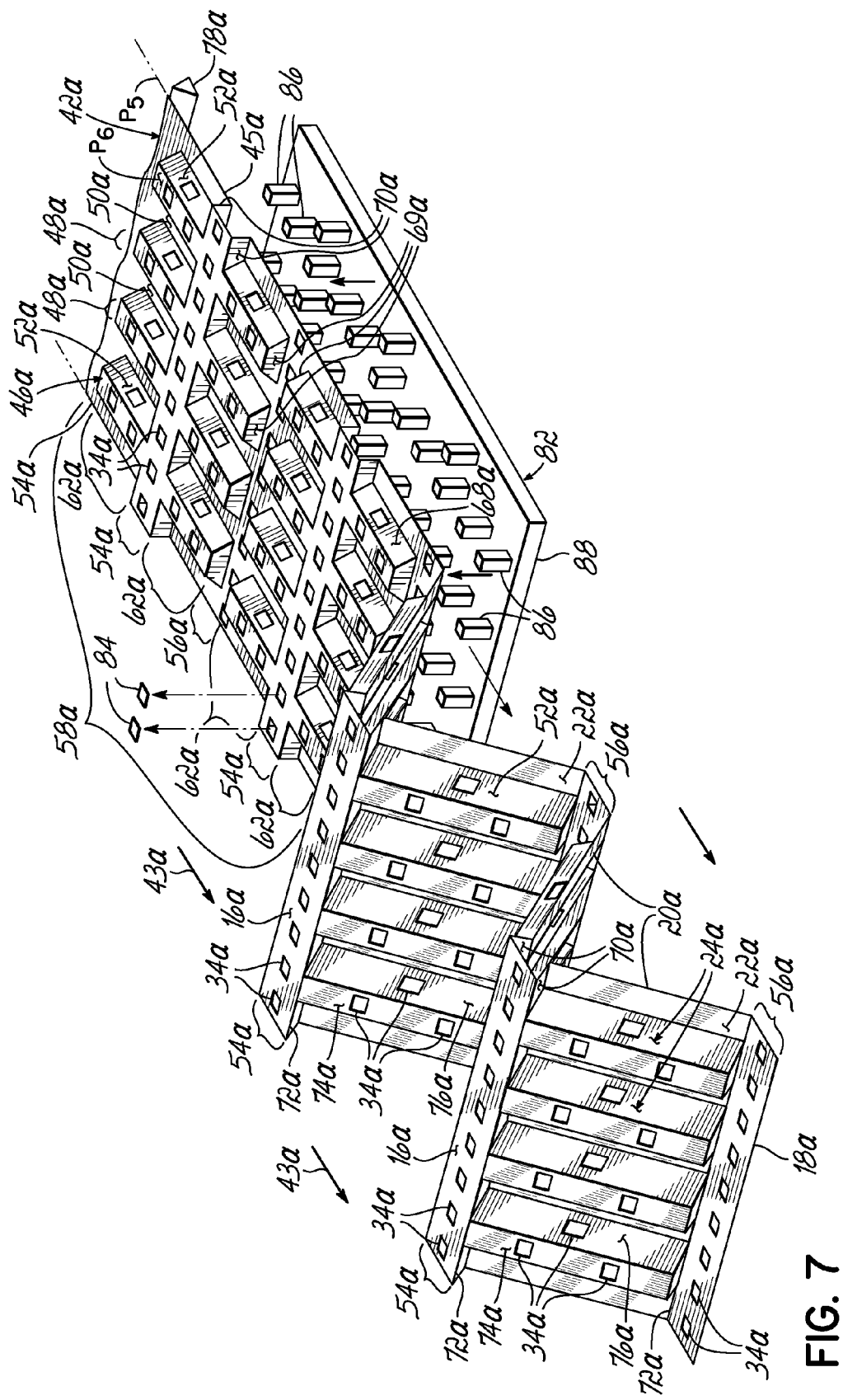
FIG. 7 is a perspective view of a portion of the plastically deformed web of FIG. 4 being treated to create a plurality of openings in the plastically deformed web.
Figure 8B:
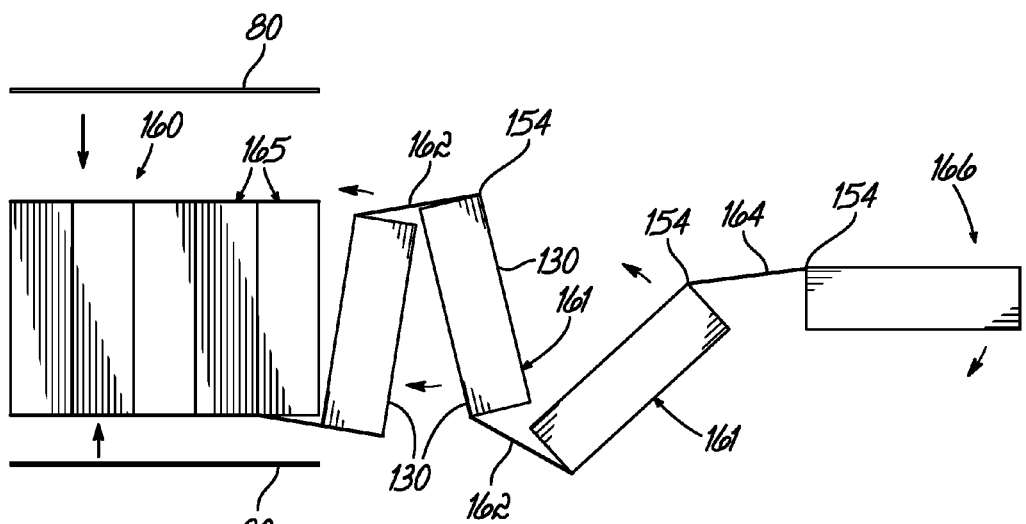
FIG. 8B is a perspective view of a portion of the plastically deformed web of FIG. 7B being folded to create rows of cells.
Figure 8:
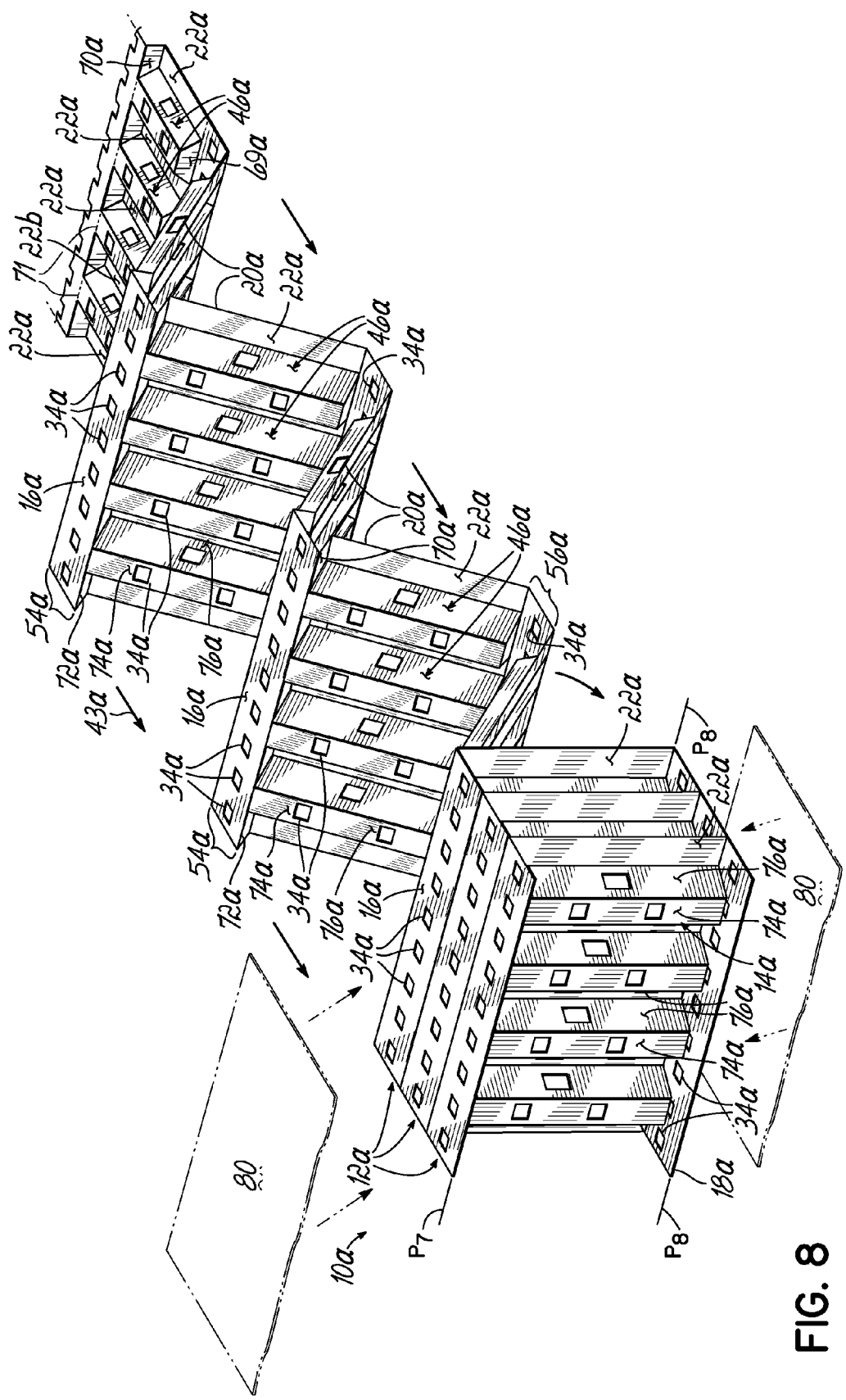
FIG. 8 is a perspective view of a portion of the plastically deformed web of FIG. 7 being further folded to create rows of cells.

FIGS. 7-8 illustrate another method or process of making a honeycomb product, which may be used alone or in a multi-layered material or product. FIG. 7 illustrates an extruded web 42a traveling in a direction indicated by arrow 43a and having a pair of opposed side edges 45a, the linear distance between which defines the width or transverse dimension of the extruded web 42a. The extruded web 42a may be any desired material of any desired thickness and/or width. The extruded web 42a is identical to extruded web 42 described above.

The extruded web 42a is then treated as described above and illustrated in FIG. 3 to create a plastically deformed web portion 58a having a plurality of corrugations 46a. As seen in FIG. 7, the corrugations 46a may comprise co-planar flattened peaks 54a in a plane P6 and flattened valleys 56a in the plane P5 of the extruded web 42a with generally rectangular flat connecting portions 52a extending therebetween. Lastly, each corrugation 46a may have an end portion 69a. These end portions 69a are illustrated as each being in the shape of a trapezoid, but may be other shapes, depending upon the shape of the corrugations.

As best illustrated in FIG. 7, each generally rectangular, transversely extending flat or flattened area 56a is located in the plane P5 of the extruded web 42a. Therefore, each generally rectangular, transversely extending flat or flattened area 54a is located in plane P6 above the plane P5 of the extruded web 42a and co-planar with the flattened peaks 48 of corrugations 46a. Flattened areas 56a and 54a alternate between corrugated areas 62a. Each flat 54a has side walls 70a extending from the outer edges of the flat 54a to the flattened valleys 50a in the corrugated regions 62a. These side walls 70a are illustrated as each being in the shape of a trapezoid, but may be other shapes, depending upon the shape of the corrugations. Although not shown, the corrugations may have a semi-circular, sinuous, curved or other cross sectional configuration.

FIG. 7 illustrates a movable tool 82 in the form of a punch press which is used to remove material 84 from plastically deformed web 58a in predetermined or preselected locations. In FIG. 7, the punch press or tool 82 has a plurality of punchers 86 mounted on a plate 88 at preselected or predetermined locations or positions to create a plurality of rectangular openings 34a through predetermined or preselected portions of the plastically deformed web 58a. These openings 34a become the openings in the honeycomb product 10a described above. See FIG. 8. Although illustrated as being rectangular, the openings 34a may be of any predefined desired size or shape and strategically located at any desired location on a portion of unrolled web. For example, the holes or openings 34a may be circular and be oriented such that each cell 14 has at least one opening 34a allowing access to the interior of the cell 14.

Although a punch press is illustrated, any other tool, such as a laser cutter, may be used to create the openings 34a through any portion of the plastically deformed portion 58a of the extruded web 42a to lighten the extruded web 42a so that when this portion of the web 42a is formed into a honeycomb product 10a, the resultant honeycomb product 10a has a relatively high strength-to-weight ratio due, at least in part, to the removal of such material during the process of manufacturing the honeycomb product.

Although the tool 82 is illustrated beneath the extruded web 42a, tool 82 may be located above the extruded web 42a or at any desired location. More than one tool may be used if desired.

As shown in FIGS. 7-8, the strategic locations of the openings 34a are such that the openings 34a are located along the flats 54a, 56a of the plastically deformed web 58a, along the flattened peaks 48a of the corrugations 46a and along connecting portions 52a of corrugations 46a. As shown in FIG. 7, each opening 34a is illustrated as being generally rectangular, but may be any predefined or preselected shape or size. As shown in FIGS. 7 and 8, some of the holes 34a in flats 54a, 56a extend through the bottoms 30a and tops 28a of cells 14a. Likewise, holes 34a through the connecting portions 52a of the corrugations 62a extend through the side walls 76a of cells 14a.

As shown in FIG. 7, after the openings 34a have been bored, punched or otherwise made, the plastically deformed web portion 58a is then folded along transversely extending fold lines 72a located generally on the edges of the flats 54a, 56a. As shown in FIGS. 7 and 8, after the plastically deformed web 58a is folded along transversely extending fold lines 72a, side walls 70a lay underneath the raised flats 54a and end walls 69a of corrugations 62a rest on flats 56a.

The last step in the process is to cut the extruded web 42a at any desired location. FIG. 7 illustrates a cutter 78a at one location. However, one or more cutting tools or devices may be used at any desired location to create a honeycomb product 10a of a desired length.

FIG. 8 shows a portion of the resultant honeycomb product 10a along with skins or layers 80 (shown in phantom), one or both of which may be secured to at least one of the upper and lower surfaces 16a, 18a of honeycomb product 10a to create a multi-layered product for any desired use. Such skins may be incorporated into a product having a honeycomb core or product made in accordance with any aspect of the present invention, including via any method described or contemplated herein.

Figure 9:
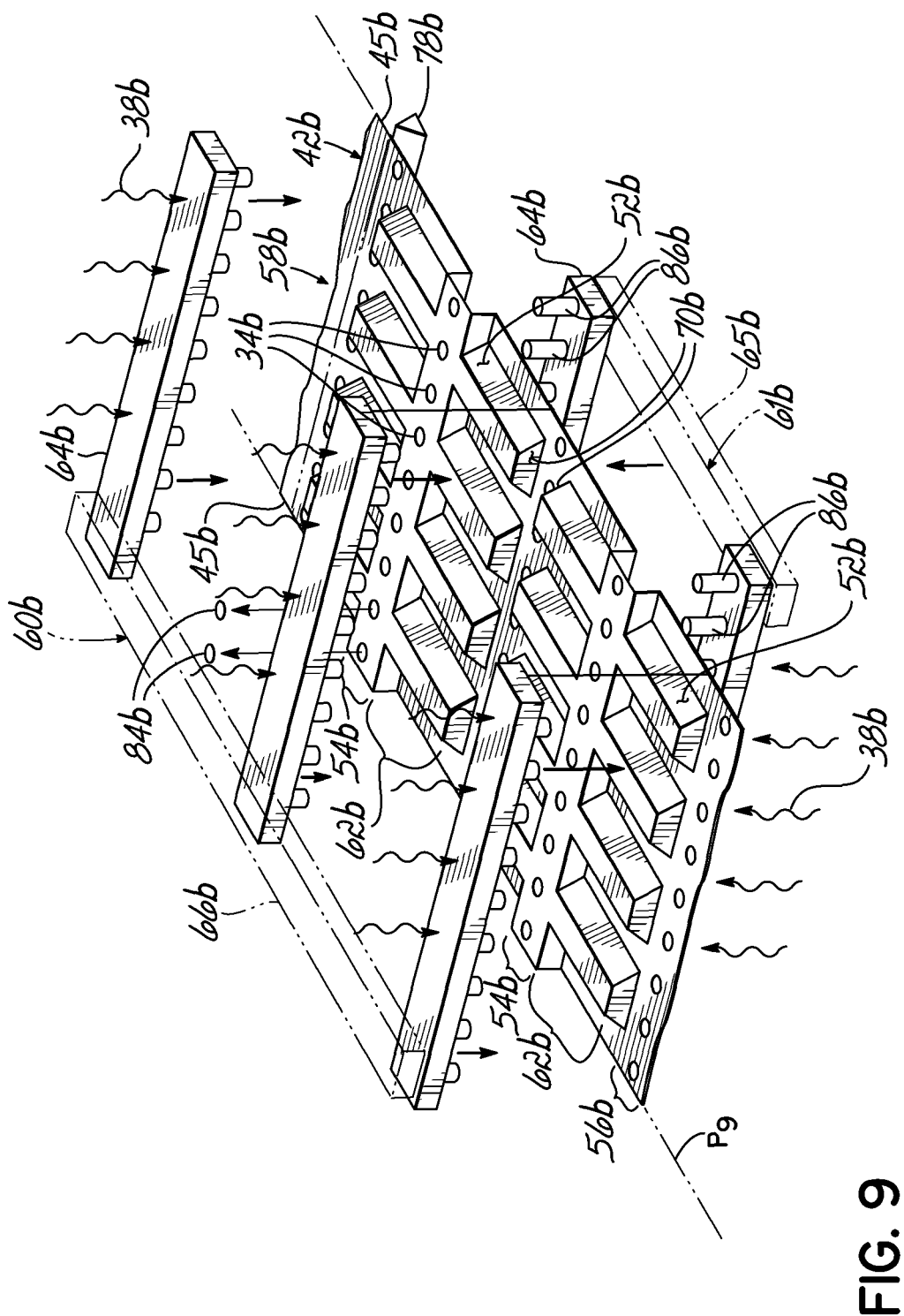
FIG. 9 is a perspective view of an extruded web having been plastically deformed and punched simultaneously according to another aspect of this invention.
Figure 10:
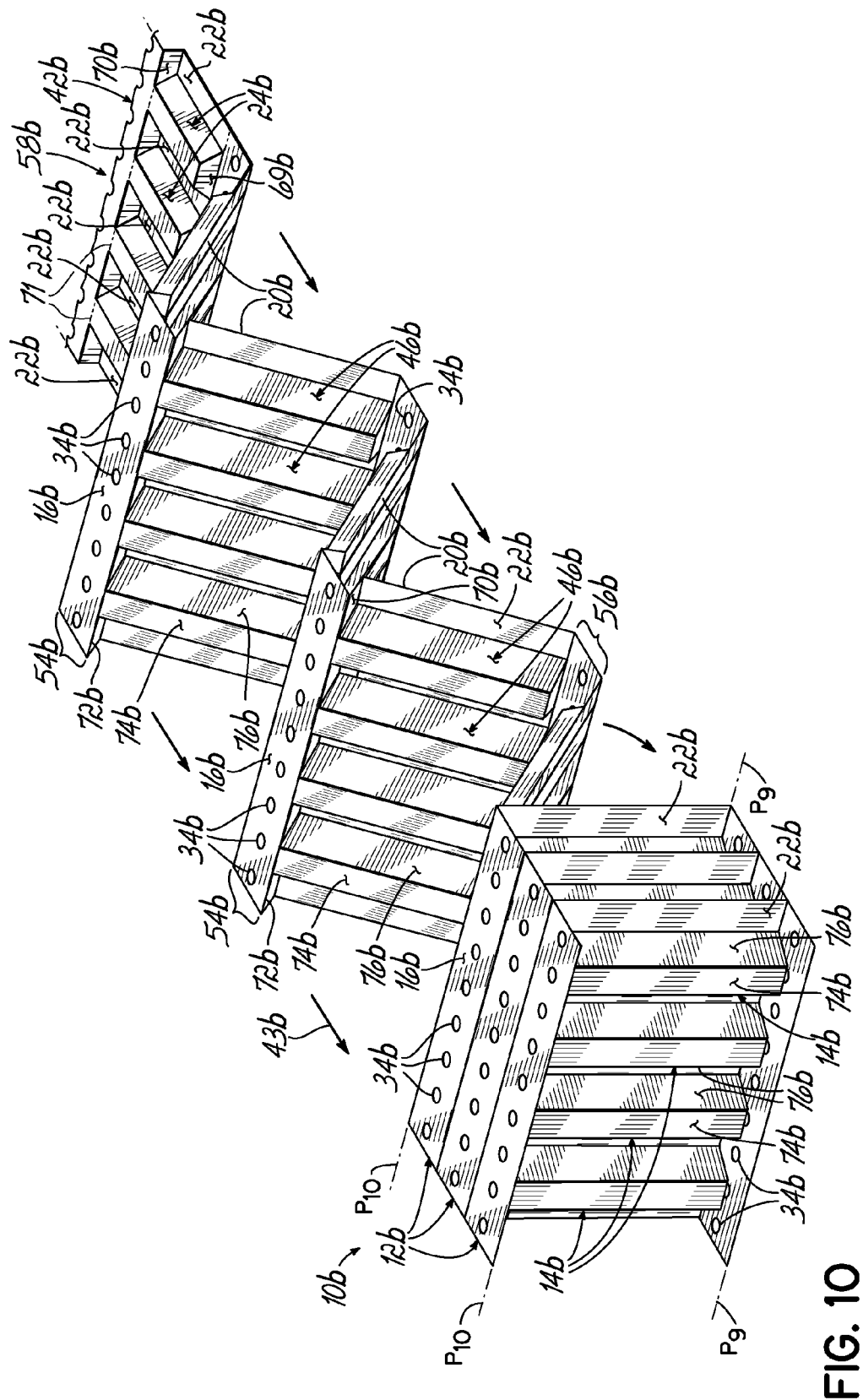
FIG. 10 is a perspective view of a portion of the plastically deformed web of FIG. 9 being folded to create rows of cells.

FIGS. 9-10 illustrate another method or process of making a honeycomb product 10b which may be used alone or in a multi-layered material or product.

FIGS. 9 and 10 illustrate another method or process of making a honeycomb product 10b which may be used alone or in a multi-layered material or product, comprising plastically deforming at least portions of the extruded web 42b. Plastic deformation may include using movable tools 60b, 61b, such as shown in FIG. 9 to create a plurality of corrugated regions or areas 62b comprising a plurality of corrugations 46b extending in a first direction generally parallel the direction of travel 43b of the web 42b or longitudinally, and a plurality of flattened areas or regions 54b, 56b each extending in a second direction perpendicular to the first direction, transversely or from side-to-side. The size of these regions or areas 62b, 54b and 56b may vary depending upon the desired size or shape of the cells 14b of the honeycomb product 10b. See FIG. 10.

FIG. 9 illustrates movable tools 60b, 61b, which, in addition to plastically deforming the extruded web 42b, also remove material 84b from plastically deformed web 58b in predetermined or preselected locations. In FIG. 9, each of the tools 60b, 61b has a plurality of punchers 86b mounted on bars 64b at preselected or predetermined locations or positions to create a plurality of circular openings 34b through predetermined or preselected portions of the plastically deformed web 58b. These openings 34b become the openings in the honeycomb product 10b described above. Although illustrated as circular, the openings 34b may be of any desired shape and strategically located at any desired location on a portion of the extruded web.

Although one configuration of tool 60b (and 61b) is illustrated comprising bars 64b joined by connectors 66b (and 65b), any other configuration or type of tool may be used to plastically deform extruded portions of web 42b. Such tools may simultaneously create openings 34b through any portion of the extruded web to lighten the extruded web 42b so that when this portion of the web 42b is folded to create honeycomb product 10b, the resultant honeycomb product 10b has a relatively high strength-to-weight ratio due, at least in part, to the removal of such material during the process of manufacturing the honeycomb product 10b.

Although the tools 60b and 61b are illustrated respectively above and below extruded web 42b, the orientation of tools 60b and 61b may be reversed, or at any other desired location, such as one after the other in a staggered format. Any number of tools 60b, 61b may be used if desired.

During the step of plastically deforming at least selected portions of the extruded web 42b, the bars 64b of the tools 60b, 61b may be chilled, at ambient temperature, or heated by any desired method to facilitate processing. Such heating is illustrated schematically by arrows 38b. This heating step is optional and may be used in certain applications only. In other applications, it may be omitted partially or entirely. This heating step may occur any time during this manufacturing process.

As shown in FIG. 10, after the web 42b has been plastically deformed and the openings 34b have been created, the plastically deformed web portion 58b is then folded along transversely extending fold lines 72b located generally on the edges of the flats 54b, 56b. As shown in FIGS. 9 and 10, after the plastically deformed web of material 58b is folded along transversely extending fold lines 72b, side walls 70b lay underneath the raised flats 54b and end walls 62b of corrugations 60b rest on flats 56b.

The last step in the process is to cut the plastically deformed extruded web 58b at any desired location. FIG. 10 illustrates a cutter 78b at one location. However, one or more cutting tools or devices may be used at any desired location to create a honeycomb product 10b of a desired length.

As noted above, the cross-section of the extruded web can assume any number of shapes. FIGS. 1A-5A illustrate an alternative method of producing a honeycomb product, and the product made by that method.

Figure 2A:
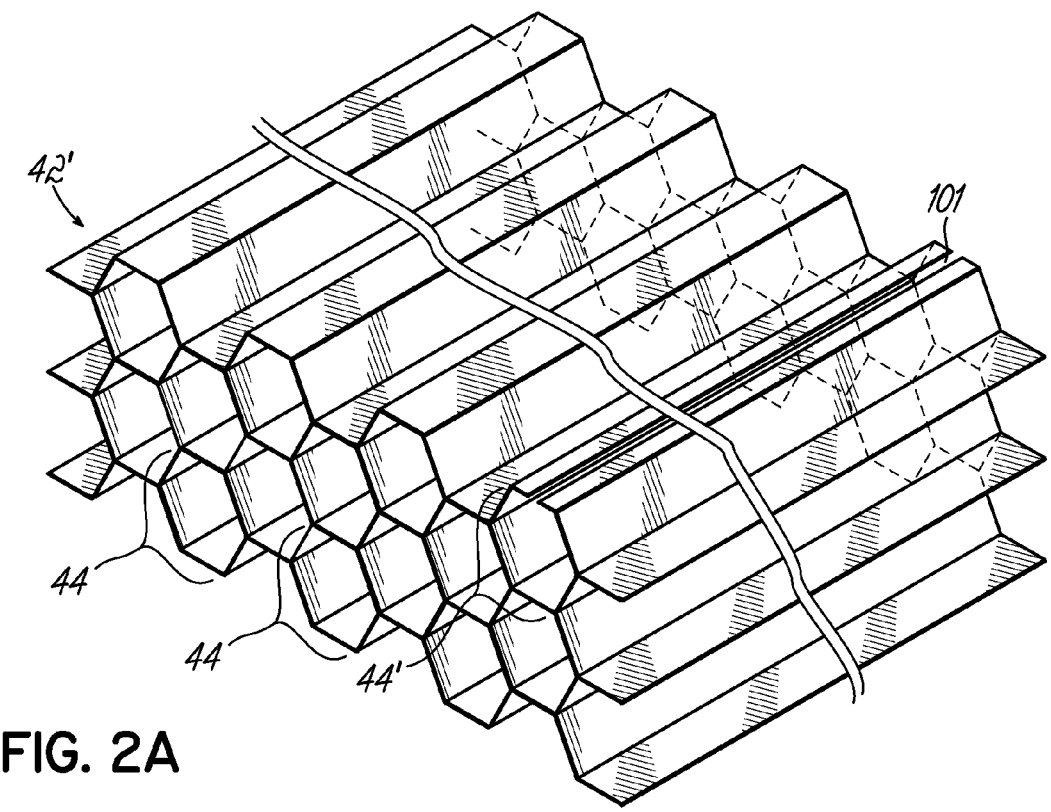
FIG. 2A is a perspective view of a portion of the extruded web of FIG. 1A.

The temperature needed to process a plasticated material through an extruder and out an extruder head, such as 41' in FIG. 1A, in conjunction with the properties of the material being extruded, the extruder speed, and complexity of the desired cross-section shape, may create an extruded web 42' which may retain an unacceptably high internal heat after exiting the extruder head 41'. If not cooled to an acceptable temperature promptly after exiting the extruder head, such an extrudate may warp or show other indicia of degradation due to excessive levels of heat being retained. As shown in FIG. 2A, the channels 44 of the web 42', though open at one end, may be otherwise effectively closed to transport air or other heat exchange medium. Such channels 44 are described herein as being closed.

To improve access, one or more access openings 101 may be introduced into one or more longitudinally extending channels 44 of the web 42'. Creation of an access opening 101 into a channel forms a modified channel 44' described herein as being substantially closed. See FIG. 2A. The access opening 101 may be created in the web 42' by appropriate machining of the extruder head 41', or by the action of a cutting or material-removing tool (not shown) downstream of the extruder head 41'. Only one access opening 101 is shown in FIG. 2A on only one channel 44, but additional channels 44 can have one or more access openings 101, up to all of the channels in the extrudate. The access opening or openings can vary in size or shape as needed to facilitate transport of sufficient quantities of a heat exchange medium between the interior and exterior of a channel 44. The access opening 101 is depicted as being continuous along the channel 44, but this is not required. Any number of access openings 101 may be any desired length.

FIG. 1A depicts an alternate extrusion cross-section shape as shown in extruder head 41'. FIG. 2A depicts an alternate extruded web 42' formed by use of extruder head 41' containing closed corrugations, or channels 44, the channel as depicted having a hexagonal shape in cross-section.

FIGS. 3A-5A depict side elevational views of the process of flattening portions of an extruded web of the general configuration depicted in FIG. 2A having channels therein, followed by folding and re-orienting portions of the extruded web to create a honeycomb structure, portions of the extruded web being re-oriented at 90° relative to their original machine direction orientation or position.

Figure 3A:
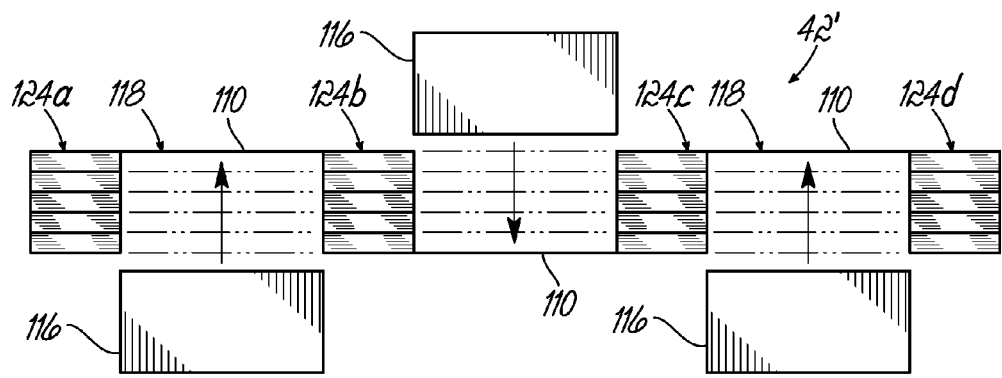
FIG. 3A is a side elevational view of a portion of the extruded web of FIG. 1A being treated to create transversely extending flats.

As shown in FIG. 3A, sections 110 of the extruded web 42' may be flattened by tools 116, alternating the sections 110 being compressed into upper flats 118 and lower flats 120. Tool 116 may apply pressure only, heat only, or a combination of pressure and heat, to create flats 118, 120.

Additional portions 124a-d shown in FIG. 3A each contain at least one channel disposed horizontally, which may be either closed or substantially closed. At least one portion is capable of being manipulated by a folding operation to mate with an adjacent portion, i.e., 124a with 124b, 124b with 124c, or 124c with 124d, as shown in FIGS. 4A and 5A, to form vertically oriented cells 14'.

FIG. 4A depicts portions 124a-d in varying degrees of re-orientation, from an original machine direction having closed channels disposed horizontally, to an orientation at 90° relative to the original machine direction, wherein the channels, now cells 14', are substantially vertical. The portions 124a-d re-orient along hinge lines 128.

FIG. 5A depicts the portions 124a-d, along with similarly disposed portions, after folding and re-orientation. The resulting honeycomb product 10' is comprised in part of re-oriented portions 124a, 124b, 124c, and 124d, with upper flats 118 and lower flats 120 respectively, disposed above and below selected portions 124a-124d, the upper and lower flats being offset relative to each other.

Figure 1B:
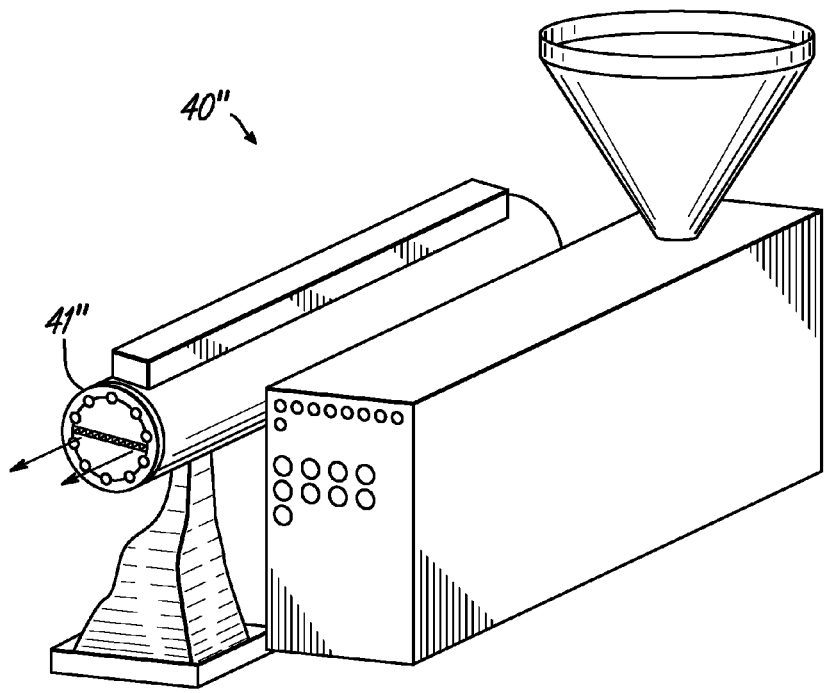
FIG. 1B is a perspective view of a web of material having a generally non-linear cross-section being extruded from an extruder head of alternate design.
Figure 2B:
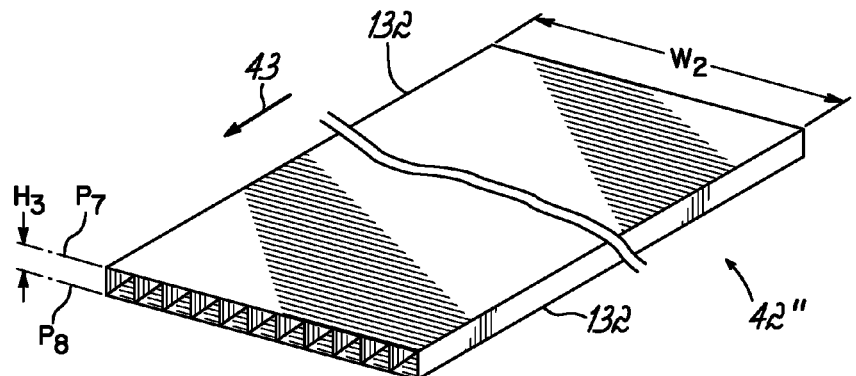
FIG. 2B is a perspective view of a portion of the extruded web of material extruded from the extruder head of FIG. 1B.

FIG. 1B depicts an extruder 40" with an alternate extruder head 41" used to extrude an extrusion 42" having a non-planar profile and non-linear cross-section, as shown in FIGS. 2B and 3B. FIG. 2B depicts a portion of the extruded web 42" formed by use of extruder head 41", the extruded web 42" having a non-linear cross-section. For purposes of this document, the portion of extruded web 42" shown in FIG. 2B has a non-planar profile because it does not comprise a single solid flat sheet of material. The present invention is intended to cover all extrusions which are not solid flat sheets or webs of material.

As seen in FIG. 3B, the extruded web 42" has spaced upper and lower horizontal walls 130 in planes P7 and P8, the linear distance between these planes defining the height H2 of the extrudate 42". The extrudate 42" also has side walls 132, the distance between which defines the width or transverse dimension W2 of the extrudate 42". Lastly, the extrudate 42" has a plurality of spacers 134 extending between the horizontal walls 130 and spaced from each other so as to define a plurality of flutes or channels 136 which extend longitudinally or in the direction of travel 43 of the web. As shown in FIG. 3B, these flutes or channels 136 have a rectangular shape in cross-section. As seen in FIG. 2B, the extruded web 42" travels in a direction indicated by arrow 43. The extruded web 42" may be any desired material of any desired thickness and/or width. This type of extrusion, if made of plastic, is known as one type of corrugated plastic.

One advantage of the present invention is the ability to extrude a product with reduced weight or density compared to the weight or density of a single solid sheet or web of the same material of the same dimensions. Due to the presence of holes, flutes or channels 136 in the extrudate 42", as best shown in FIG. 3B, the weight of any length of extrudate 42" is less than half the weight of a solid piece of material of the same dimensions. The same is also true of the extrudate shown in FIG. 2.

Figure 4B:
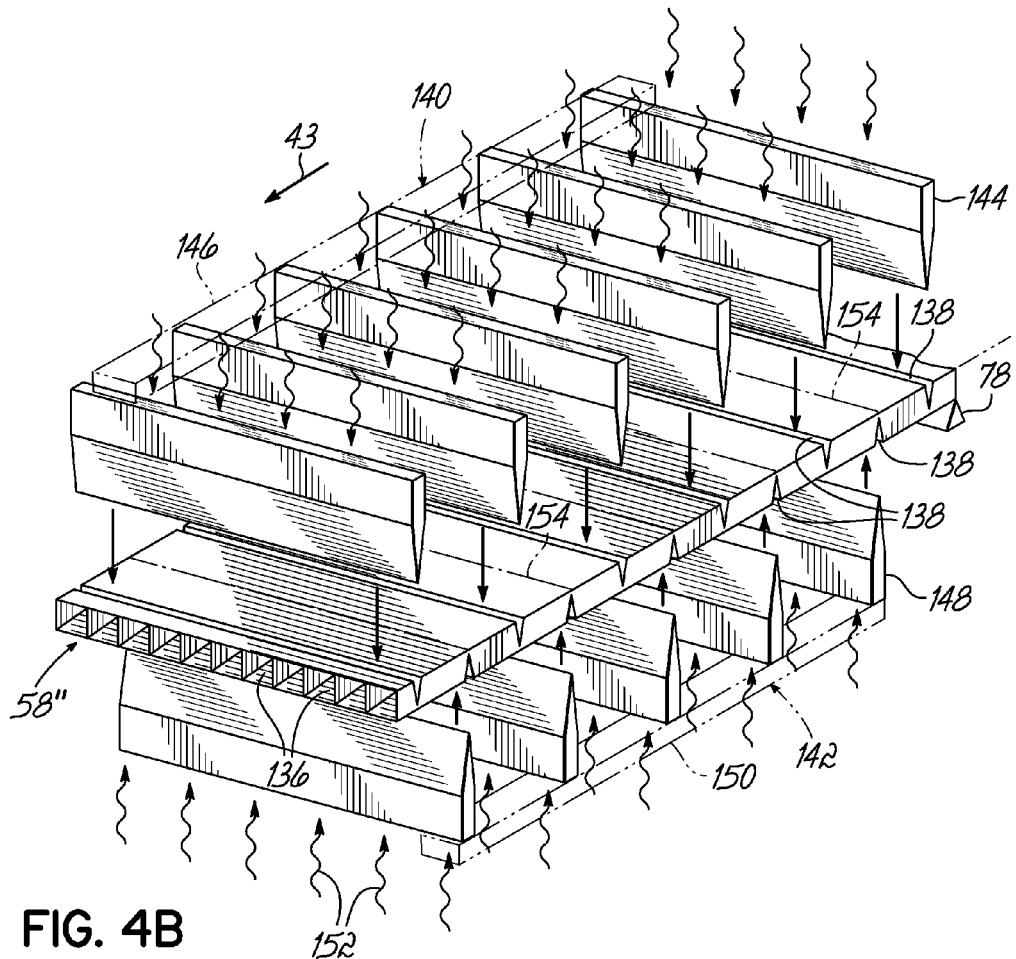
FIG. 4B is a perspective view of a portion of the extruded web of FIG. 2B being treated to create a plurality of plastically deformed areas or regions.

FIGS. 4B and 5B illustrate additional steps in this process of making product 10". FIG. 4B illustrates the step of plastically deforming at least selected portions or areas 138 of the extruded web 42" to create a plastically deformed extruded web 58". This plastic deformation may include using movable tools 140, 142, such as shown in FIG. 4B, to interrupt the continuous corrugations or flutes 136 formed in the emerging extruded web 42" and create a plurality of generally V-shaped plastically deformed regions or areas 138, each extending generally perpendicular to the direction of travel 43 of the extruded web 42" or transversely or from side-to-side. The size of these regions or areas 138 may vary depending upon numerous factors, including the desired size or shape of the cells 14 of the resulting product 10".

Although tool 140 is illustrated as comprising six deforming members 144 joined together with connectors 146 (only one being shown for clarity), and tool 142 is illustrated as comprising five deforming members 148 joined together with connectors 150 (only one being shown for clarity), respectively, these tools 140, 142 may comprise any number of deforming members of any desired size or configuration, joined together or not. Although two movable tools are illustrated, any number of tools of any desired type or configuration may be used. Again, the term tool is not intended to be limiting and may include any tool known in the art.

During the step of plastically deforming at least selected portions of the extruded web 42", the deforming members 144, 148 of tools 140, 142, respectively, may be chilled, at ambient temperature, or heated by any desired method to facilitate processing. Such heating is illustrated schematically by arrows 152. This heating step is optional and may be used in certain applications only. In other applications, it may be omitted partially or entirely. Although it is shown schematically during the creation of the plastic deformed areas 138 of the extruded web 42" using tools 140, 142, this heating step may occur any time during this manufacturing process.

Figure 6B:
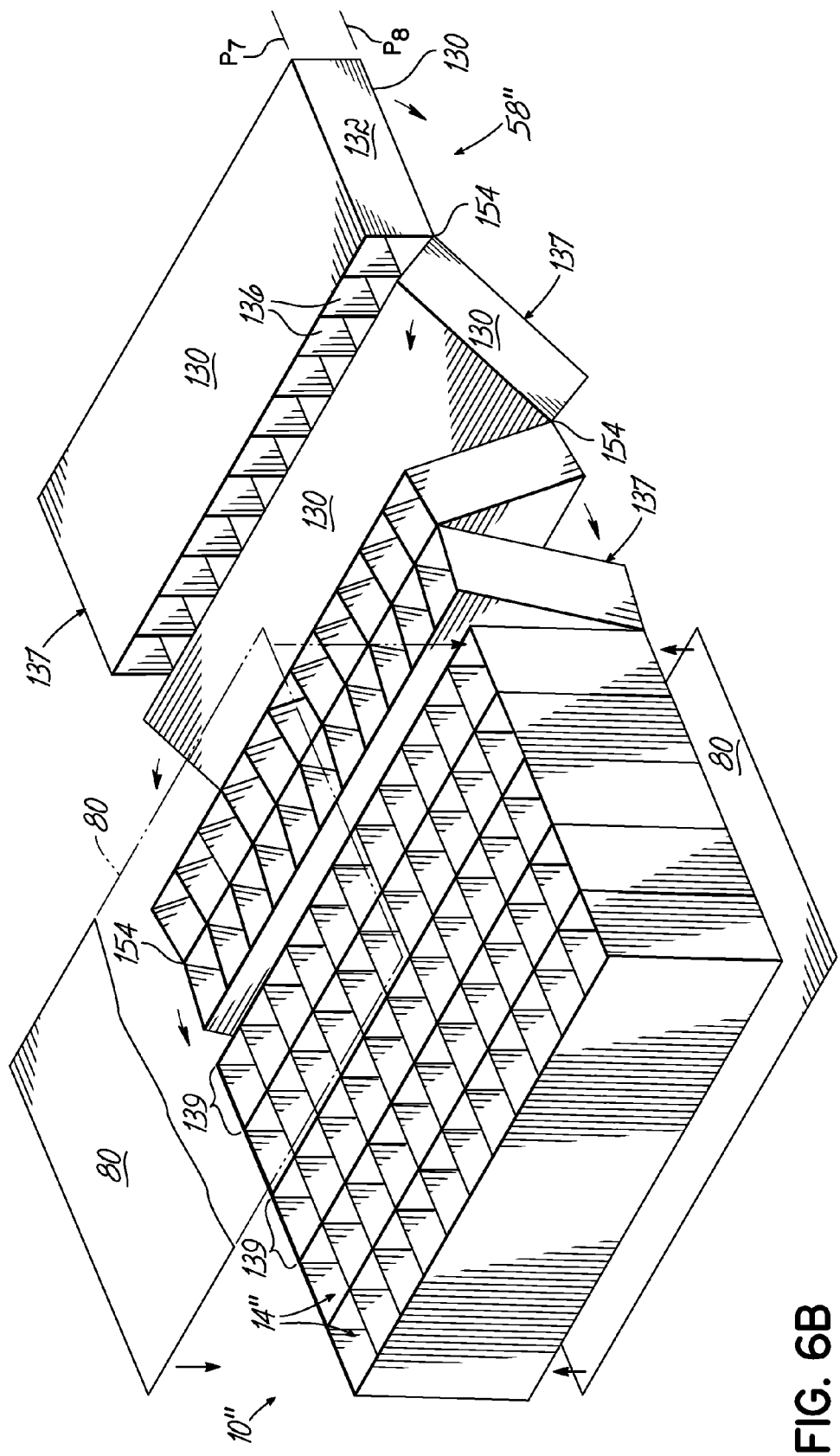
FIG. 6B is a perspective view of a portion of the extruded web of FIGS. 1B-5B being folded to create a portion of a product.

As shown in FIGS. 5B and 6B, the plastically deformed web portion 58" is then folded along transversely extending fold lines 154 located generally in the planes P7 and P8 of the extrudate 42". See FIG. 3B. Such fold lines 154 may be optionally scored or perforated at any step in the manufacturing process, with cuts (not shown) to assist folding. Such scoring may be made by a separate tool or tools. As shown in FIG. 6B, after the plastically deformed web portion 58" is folded along transversely extending fold lines 154, horizontal walls 130 of extrudate 42" become vertically oriented, and the flutes 136 become the vertically oriented cells 14" of the resultant product 10".

Another step in the process may be to cut the extruded web 42" at any desired location. FIG. 4B illustrates a cutter 78 at one location. However, one or more cutting tools or devices may be used at any desired location to create a product 10" of a desired length.

FIG. 6B shows a portion of the resultant product 10" along with skins or layers 80 (shown in phantom), one or both of which may be secured to at least one of the upper and lower surfaces of product 10" to create a multi-layered or sandwich-like product for any desired use. As shown in FIG. 6B, the plastically deformed web 58" is folded alternatively in upper and lower planes P7 and P8 to create a plurality of blocks 137, each block 137 containing a row 139 of vertically oriented cells 14". If desired, adjacent blocks 137 may be adhesively or otherwise joined to each other to create product 10" with or without any skins 80.

Figure 7B:
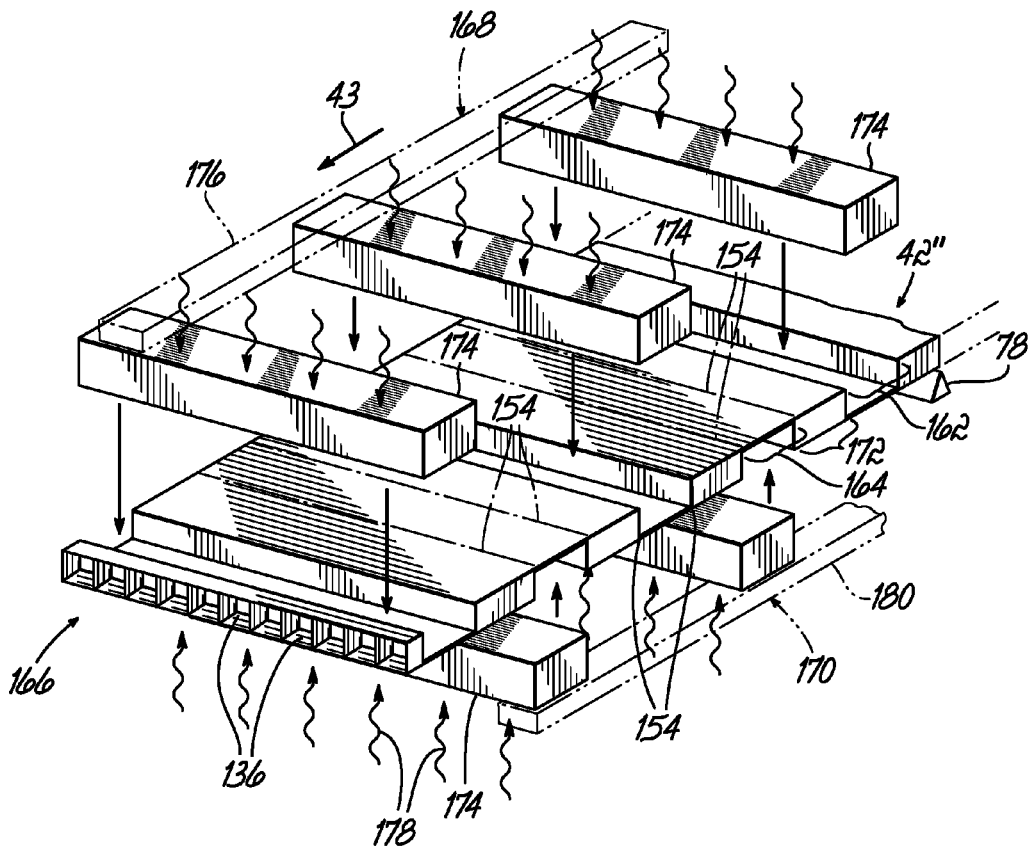
FIG. 7B is a perspective view of a portion of the extruded web of FIG. 2B being treated to create a plurality of plastically deformed areas or regions in the form of flats.

FIGS. 7B and 8B illustrate another method or process of making a product 160, which may be used alone or in a multi-layered material or product. FIG. 7B illustrates an extruded web 42" like the one described above and shown in FIGS. 1B, 2B and 3B traveling in a direction indicated by arrow 43.

This method comprises plastically deforming or flattening at least selected portions or areas 162, 164 of the extruded web 42" to create a plastically deformed extruded web 166. This plastic deformation may include using movable tools 168, 170, such as shown in FIG. 7B to interrupt the continuous corrugations or flutes 136 formed in the emerging extruded web 42" and create a plurality of non-deformed regions or areas 172 and a plurality of flats or flattened areas 162, 164, each extending in a second direction perpendicular to the direction of travel of the extruded web, transversely or from side-to-side. The size and location of these regions or areas 162, 164 and 172 may vary depending upon the desired size or shape of the cells 165 of the resultant product 160.

Although tool 168 is illustrated as comprising three bars 174 joined together with connectors 176 (only one being shown for clarity), and tool 170 is illustrated as comprising two bars 174 joined together with connectors 180 (only one being shown for clarity), respectively, these tools 168, 170 may comprise any number of bars of any desired size or configuration joined together or not. Although two tools are illustrated, any number of tools of any desired type or configuration may be used. Again, the term tool is not intended to be limiting and may include any tool known in the art.

During the step of plastically deforming at least selected portions of the extruded web 42", the bars 174 of the tools 168, 170 may be chilled, at ambient temperature, or heated by any desired method to facilitate processing. Such heating is illustrated schematically by arrows 178. This heating step is optional and may be used in certain applications only. In other applications, it may be omitted partially or entirely. Although it is shown schematically after the flats 162, 164 have been created in the extruded web 42", this heating step may occur any time during this manufacturing process.

As best illustrated in FIGS. 7B and 8B, each generally rectangular, transversely extending flat or flattened area 162 is located in the plane P8 of the extruded web 42". Each generally rectangular, transversely extending flat or flattened area 164 is located in plane P7 above the plane P8 of the extruded web 42". Flattened areas 162 and 164 alternate between corrugated or non-deformed regions 172. Each corrugated region 172 comprises rows of corrugations.

As shown in FIG. 5B, the plastically deformed web portion 166 is then folded along transversely extending fold lines 154 located generally in the planes P7 and P8 of the extrudate 42". See FIG. 3B. Such fold lines 154 may be optionally scored or perforated at any step in the manufacturing process with cuts (not shown) to assist folding. Such scoring may be made by a separate tool or tools. As shown in FIG. 6B, after the plastically deformed web portion 166 is folded along transversely extending fold lines 154, horizontal walls 130 of extrudate 42" become vertically oriented, and the flutes 136 become the cells 14" of the resultant product 160.

FIG. 8B shows a portion of the resultant product 160 along with skins or layers 80 (shown in phantom), one or both of which may be secured to at least one of the upper and lower surfaces of product 160 to create a multi-layered or sandwich-like product for any desired use. As shown in FIG. 8B, the plastically deformed web 166 is folded alternatively in upper and lower planes P7 and P8 to create a plurality of blocks 161, each block 161 containing a row of vertically oriented cells like the ones shown in FIG. 6B. If desired, adjacent blocks 161 may be adhesively or otherwise joined to each other to create product 160 with or without skins 80.

Another step in the process may be to cut the extruded web 166 at any desired location. FIG. 7B illustrates a cutter 78 at one location. However, one or more cutting tools or devices may be used at any desired location to create a product 160 of a desired length.

Figure 1C:
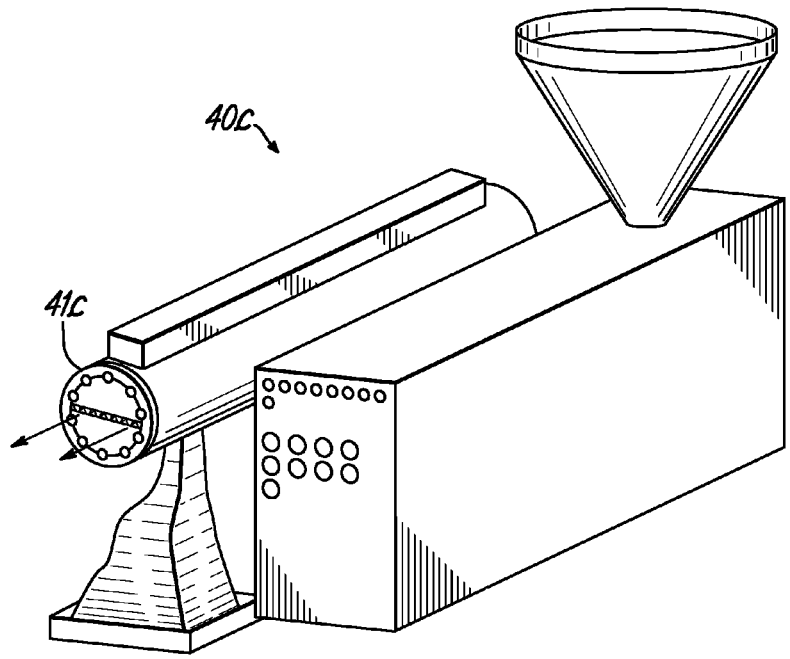
FIG. 1C is a perspective view of a web of material having a generally non-linear cross-section being extruded from an extruder head of alternate design.
Figure 2C:
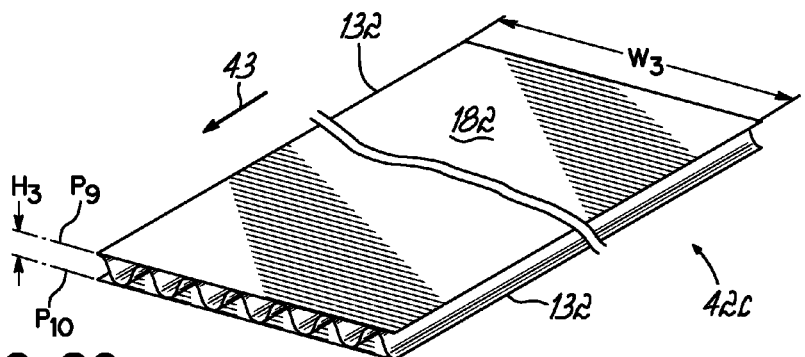
FIG. 2C is a perspective view of a portion of the extruded web of material extruded from the extruder head of FIG. 1C.

FIG. 1C depicts an extruder 40c with an alternate extruder head 41c used to extrude an extrusion having a non-planar profile and non-linear cross-section as shown in FIGS. 2C and 3C. FIG. 2C depicts a portion of the extruded web 42c formed by use of extruder head 41c, the extruded web 42c having a non-linear cross-section. FIG. 2C depicts an alternate extruded web 42c formed by use of extruder head 41c, the extruded web 42c having a non-linear cross-section. As seen in FIG. 3C, the extruded web 42c has spaced upper and lower horizontal walls 182 in planes P9 and P10, the linear distance between these planes defining the height H3 of the extrudate 42c. The extrudate 42c also has side edges 184, the distance between which defines the width or transverse dimension W3 of the extrudate 42c. Lastly, the extrudate 42c has a sinuous middle member 186 extending between the horizontal walls 182 so as to define a plurality of flutes or channels 188, which extend longitudinally. As seen in FIG. 2C, the extruded web 42c travels in a direction indicated by arrow 43. The extruded web 42c may be any desired material of any desired thickness and/or width. Such an extruded web 42c may be treated or processed as described above to create a product for use alone or in a sandwich-like core product.

While we have described several preferred embodiments of the present invention, persons skilled in the art will appreciate changes and modifications which may be made without departing from the spirit of the invention. For example, although one configuration of a cell is illustrated and described, the cells of the present invention may be other configurations, such as cylindrical in shape. Therefore, we intend to be limited only by the scope of the following claims and equivalents thereof.

We claim:

1. A process of making a sandwich-like product comprising:
   extruding a web of material having a generally non-planar profile comprising continuous corrugations with continuous flattened peaks and flattened valleys joined by connecting portions extending in the direction of travel of the web;
   interrupting the continuous corrugations of the extruded web using movable tools on opposite sides of the extruded web to create non-perforated transversely extending rectangular flats to create a plastically deformed web;
   folding the plastically deformed web along transversely extending fold lines along the edges of the flats to create a honeycomb core comprising a plurality of cells arranged in rows, each of the cells having a top and a bottom, the top and bottom each being in the shape of a polygon;
   applying generally planar outer skins to the tops and bottoms of the cells of the honeycomb core to create a multi-layered web; and
   cutting the multi-layered web.

2. The process of claim 1 further comprising forming a plurality of openings in the extruded web by removing material from the web.

3. The process of claim 2 wherein forming a plurality of openings in the extruded web comprises stamping the material.

4. The process of claim 1 wherein interrupting the continuous corrugations of the extruded web comprises contacting the extruded web with at least one heated element.

5. The process of claim 1 wherein the outer skins are secured to upper and lower surfaces of the honeycomb core.

6. The process of claim 1 wherein the flats are co-planar with either the flattened peaks or the flattened valleys and alternate between being co-planar with a flattened peak and being co-planar with a flattened valley.

7. A process of making a product comprising:
   extruding a web of material such that the extruded web has a generally non-linear cross-section comprising continuous corrugations with continuous flattened peaks and flattened valleys joined by connecting portions extending in the direction of travel of the web;
   flattening rectangular, non-perforated transversely extending areas of the extruded web using movable tools on opposite sides of the extruded web to create non-perforated, transversely extending flattened areas between corrugated sections, every other one of the flattened areas being co-planar with the flattened peaks of the extruded web;
   folding the extruded web along transversely extending fold lines located generally on the edges of the flattened areas such that the corrugated sections become sidewalls of a honeycomb core comprising a plurality of identical cells arranged in rows, the corrugated sections of the extruded web becoming the sidewalls of the cells and the flattened areas become tops and bottoms of the cells;
   applying generally planar outer skins to the tops and bottoms of the cells of the honeycomb core to create a multi-layered web; and
   cutting the multi-layered web.

8. The process of claim 7 further comprising forming at least one opening in the extruded web by removing material from the web.

9. The process of claim 8 wherein forming a plurality of openings in the extruded web comprises stamping the material.

10. The process of claim 7 wherein the extruded web is flattened by at least one tool applying pressure.

11. The process of claim 7 wherein the extruded web is flattened by at least one tool applying heat.

12. The process of claim 8 wherein creating a plurality of openings in the extruded web comprises removing material from the extruded web using at least one tool.

13. A process of making a sandwich-like product comprising:
   extruding a web of material such that the extruded web has a generally non-linear cross-section comprising continuous corrugations having continuous flattened peaks and continuous flattened valleys joined by continuous connecting portions extending in a longitudinal direction;
   interrupting the continuous corrugations of the extruded web using movable tools on opposite sides of the extruded web to create spaced non-perforated, transversely extending flats to create a plastically deformed web, the flats being generally co-planar with either the flattened peaks or the flattened valleys of the continuous corrugations where the flats alternate between being generally co-planar with a flattened peak and being generally co-planar with a flattened valley;
   folding the plastically deformed web along transversely extending fold lines along the edges of the flats to create a honeycomb core comprising a plurality of cells arranged in rows, each of the cells having a top and a bottom, the top and bottom each being in the shape of a polygon, one of the top and bottom being single ply and the other of the top and bottom being double ply;
   applying outer skins to the tops and bottoms of the cells of the honeycomb core to create a multi-layered web; and
   cutting the multi-layered web.

14. The process of claim 13 wherein said extruded web is corrugated plastic.

15. The process of claim 13 wherein said step of interrupting the continuous corrugations of the extruded web comprises using at least one heated tool.

16. A process of making a sandwich-like product comprising:
   extruding a web of material having a generally non-planar profile comprising continuous corrugations with continuous flattened peaks and flattened valleys joined by connecting portions extending in the direction of travel of the web;
   flattening selected areas of the extruded web using at least one movable tool to interrupt the continuous corrugations to create a plurality of corrugated regions each comprising a plurality of corrugations extending in a first direction generally parallel to the direction of travel of the extruded web and a plurality of continuous, transversely extending, non-perforated rectangular flats each extending in a second direction perpendicular to the first direction;

folding the web along fold lines extending in the second direction to create a honeycomb core, the fold lines being along the edges of the flattened areas, the honeycomb core comprising a plurality of cells arranged in rows, each of the cells having sidewalls made from the interrupted corrugations of the extruded web, a top in the shape of a polygon and a bottom in the shape of a polygon;

applying outer skins to the tops and the bottoms of the honeycomb core to create a multi-layered web; and cutting the multi-layered web.

17. The process of claim 16 wherein said at least one movable tool is heated.

18. The process of claim 16 wherein every other one of the flats is co-planar with the flattened peaks.

19. The process of claim 16 wherein said step of flattening selected areas of the extruded web comprises using at least one heated movable tool to interrupt the continuous corrugations.

* * * * *